United States Patent
Diehl et al.

(10) Patent No.: US 10,740,459 B2
(45) Date of Patent: Aug. 11, 2020

(54) KERNEL- AND USER-LEVEL COOPERATIVE SECURITY PROCESSING

(71) Applicant: CrowdStrike, Inc., Irvine, CA (US)

(72) Inventors: David F. Diehl, Minneapolis, MN (US); Milos Petrbok, Redmond, WA (US); Colin Christopher McCambridge, Minneapolis, MN (US); Aaron Putnam, Irvine, CA (US)

(73) Assignee: CrowdStrike, Inc., Irvine, CA (US)

(*) Notice: Subject to any disclaimer, the term of this patent is extended or adjusted under 35 U.S.C. 154(b) by 296 days.

(21) Appl. No.: 15/857,007

(22) Filed: Dec. 28, 2017

(65) Prior Publication Data

US 2019/0205533 A1    Jul. 4, 2019

(51) Int. Cl.
*G06F 21/56*   (2013.01)
*G06F 21/55*   (2013.01)
(Continued)

(52) U.S. Cl.
CPC ............ *G06F 21/554* (2013.01); *G06F 21/53* (2013.01); *G06F 21/566* (2013.01);
(Continued)

(58) Field of Classification Search
CPC ......... H04L 63/14; G06F 21/55; G06F 21/56; G06F 21/60
See application file for complete search history.

(56) References Cited

U.S. PATENT DOCUMENTS

| 6,088,804 A | 7/2000 | Hill et al. |
| 6,463,584 B1 | 10/2002 | Gard et al. |

(Continued)

FOREIGN PATENT DOCUMENTS

| EP | 0648353 | 4/1995 |
| JP | 2006065835 | 3/2006 |

(Continued)

OTHER PUBLICATIONS

The Japanese Office Action dated Jan. 8, 2019 for Japanese Patent Application No. 2017-177787, a counterpart of U.S. Pat. No. 9,043,903, 7 pages.

(Continued)

*Primary Examiner* — Izunna Okeke
(74) *Attorney, Agent, or Firm* — Lee & Hayes, P.C.

(57) ABSTRACT

Some examples detect malicious activity on a computing device. A processor in kernel mode detects an event on the computing device. The processor provides a validation request on a kernel-level bus. A bidirectional bridge component transmits the request to a user-level bus. The processor in user mode determines that the event is associated with malicious activity and provides a validation response on the user-level bus. The bridge component transmits the validation response to the kernel-level bus. In some examples, the processor in user mode receives security-relevant information from a system service of the computing device, and analyzes the event based at least in part on the security-relevant information. In some examples, the processor in user mode receives a security query, queries the kernel mode via the bridge component, and responds to the security query indicating that the data stream is associated with malware.

20 Claims, 13 Drawing Sheets

(51) Int. Cl.
*G06F 21/53* (2013.01)
*H04L 9/32* (2006.01)
*G06F 21/60* (2013.01)
*H04L 29/06* (2006.01)

(52) U.S. Cl.
CPC .......... *G06F 21/567* (2013.01); *G06F 21/606* (2013.01); *H04L 9/3268* (2013.01); *G06F 2221/034* (2013.01); *G06F 2221/2149* (2013.01)

(56) References Cited

U.S. PATENT DOCUMENTS

| | | | |
|---|---|---|---|
| 7,099,948 | B2 | 8/2006 | Tormasov et al. |
| 7,281,268 | B2 | 10/2007 | Hollander et al. |
| 7,448,049 | B1 | 11/2008 | Xing |
| 7,478,237 | B2 | 1/2009 | Costea et al. |
| 7,571,448 | B1 | 8/2009 | Sallam |
| 7,765,400 | B2 | 7/2010 | Costea et al. |
| 7,765,410 | B2 | 7/2010 | Costea et al. |
| 7,908,656 | B1 | 3/2011 | Mu |
| 8,065,728 | B2 | 11/2011 | Wang et al. |
| 8,239,947 | B1 | 8/2012 | Glick et al. |
| 8,429,429 | B1 | 4/2013 | Kargman et al. |
| 8,539,584 | B2 | 9/2013 | Ramalingam |
| 8,572,733 | B1 | 10/2013 | Rockwood |
| 8,607,340 | B2 | 12/2013 | Wright |
| 8,762,298 | B1 | 6/2014 | Ranjan et al. |
| 8,776,218 | B2 | 7/2014 | Wright |
| 8,776,227 | B1 | 7/2014 | Glick et al. |
| 9,043,903 | B2 | 5/2015 | Diehl et al. |
| 9,571,453 | B2 | 2/2017 | Diehl et al. |
| 9,621,515 | B2 | 4/2017 | Diehl et al. |
| 10,002,250 | B2 | 6/2018 | Diehl |
| 10,339,322 | B2 | 7/2019 | Kim et al. |
| 10,476,904 | B2 | 11/2019 | Yamada et al. |
| 10,503,904 | B1* | 12/2019 | Singh .................... G06F 21/554 |
| 2001/0044904 | A1 | 11/2001 | Berg et al. |
| 2004/0153724 | A1 | 8/2004 | Nicholson et al. |
| 2006/0156380 | A1 | 7/2006 | Gladstone et al. |
| 2007/0022287 | A1 | 1/2007 | Beck et al. |
| 2007/0094496 | A1 | 4/2007 | Burtscher |
| 2007/0143850 | A1 | 6/2007 | Kraemer et al. |
| 2007/0153993 | A1 | 7/2007 | Cohen |
| 2007/0250817 | A1 | 10/2007 | Boney |
| 2008/0034429 | A1 | 2/2008 | Schneider |
| 2008/0162589 | A1 | 7/2008 | Rodeheffer et al. |
| 2008/0189796 | A1 | 8/2008 | Linn et al. |
| 2008/0209505 | A1 | 8/2008 | Ghai et al. |
| 2008/0282198 | A1 | 11/2008 | Brooks et al. |
| 2009/0070878 | A1 | 3/2009 | Wang et al. |
| 2010/0169973 | A1 | 7/2010 | Kim et al. |
| 2010/0235879 | A1 | 9/2010 | Burnside et al. |
| 2011/0010522 | A1 | 1/2011 | Abts et al. |
| 2011/0029772 | A1 | 2/2011 | Fanton et al. |
| 2011/0099632 | A1 | 4/2011 | Beck et al. |
| 2011/0145598 | A1 | 6/2011 | Smith et al. |
| 2011/0209219 | A1 | 8/2011 | Zeitlin et al. |
| 2011/0239306 | A1 | 9/2011 | Avni et al. |
| 2012/0005542 | A1 | 1/2012 | Petersen et al. |
| 2012/0167161 | A1 | 6/2012 | Kim |
| 2012/0246297 | A1 | 9/2012 | Shanker et al. |
| 2012/0255012 | A1 | 10/2012 | Sallam |
| 2013/0145465 | A1 | 6/2013 | Wang et al. |
| 2013/0291112 | A1 | 10/2013 | Shue et al. |
| 2013/0312095 | A1 | 11/2013 | Edwards et al. |
| 2013/0312099 | A1 | 11/2013 | Edwards et al. |
| 2013/0333040 | A1 | 12/2013 | Diehl et al. |
| 2014/0109226 | A1 | 4/2014 | Diehl et al. |
| 2014/0317405 | A1 | 10/2014 | Johnson et al. |
| 2015/0007331 | A1* | 1/2015 | Pfeifer, Jr. .......... H04L 63/1433 726/25 |
| 2015/0101044 | A1 | 4/2015 | Martin et al. |
| 2015/0128206 | A1 | 5/2015 | Ben Haim et al. |
| 2015/0244679 | A1 | 8/2015 | Diehl et al. |
| 2015/0356301 | A1 | 12/2015 | Diehl et al. |
| 2017/0109530 | A1 | 4/2017 | Diehl et al. |
| 2017/0213031 | A1 | 7/2017 | Diehl et al. |
| 2017/0279614 | A1* | 9/2017 | Mercury .............. H04L 9/3247 |
| 2018/0239657 | A1 | 8/2018 | Petrbok et al. |
| 2020/0026855 | A1 | 1/2020 | Moyal et al. |

FOREIGN PATENT DOCUMENTS

| | | |
|---|---|---|
| JP | 2006134307 | 5/2006 |
| JP | 2008507757 | 3/2008 |
| JP | 2009238153 | 10/2009 |
| JP | 2010517164 | 5/2010 |
| JP | 2010182019 | 8/2010 |
| KR | 101038048 | 6/2011 |
| WO | WO2012107557 | 8/2012 |
| WO | WO2012135192 | 10/2012 |
| WO | WO2013164821 | 11/2013 |

OTHER PUBLICATIONS

Office Action for U.S. Appl. No. 15/438,553, dated Nov. 1, 2018, Petrbok et al, "Symmetric Bridge Component for Communications Between Kernel Mode and User Mode", 17 pages.

The Extended European Search Report dated Jun. 15, 2018 for European Patent Application No. 18157955.8, 10 pages.

Graf, "Netlink Library (libnl)", retrieved on Jun. 5, 2018 at <<https://www.infradead.org/~tgr/libnl/doc/core.html>>, May 9, 2011, 63 pages.

Kaichuan, "Kernel Korner—Why and How to Use Netlink Socket", retrieved on Jun. 5, 2018 at <<https://www.linuxjournal.com/article/7356>>, Jan. 5, 2015, pp. 1-13.

Neira-Ayuso, et al., "Communicating between the kernel and user-space in Linux using Netlink sockets", Software—Practice and Experience, vol. 40, No. 9, Aug. 1, 2010, Wiley Interscience, pp. 797-810.

The European Office Action dated Jul. 5, 2019 for European Patent Application No. 13808592.3, a counterpart of U.S. Pat. No. 9,292,881, 5 pages.

The Australian Office Action dated Jan. 22, 2018 for Australian Patent Application No. 2013272198, a counterpart foreign application of U.S. Pat. No. 9,043,903, 5 pages.

The European Office Action dated Nov. 22, 2017 for European patent application No. 13800519.4, a counterpart foreign application of U.S. Pat. No. 9,043,903, 7 pgaes.

The Supplementary European Search Report dated Nov. 3, 2015 for European Patent Application No. 13800519.4, 7 pages.

The Supplementary Extended European Search Report dated Feb. 16, 2016 for European patent application No. 1380051934, 22 pages.

Translated Israeli Office Action dated Aug. 30, 2017 for Israeli patent application No. 235905, a counterpart foreign application of U.S. Pat. No. 9,043,903, 5 pages.

Translated Japanese Office Action dated Apr. 25, 2017 for Japanese Patent Application No. 2015-516024, a counterpart foreign application of U.S. Pat. No. 9,043,903, 22 pages.

King et al, "Backtracking Intrusions", ACM SOSP, Oct. 2003, vol. 37, Issue 5, 14 pgs.

Final Office Action for U.S. Appl. No. 13/492,672, dated Oct. 23, 2014, David F. Diehl, "Kernel-Level Security Agent", 15 pages.

Office action for U.S. Appl. No. 15/393,797, dated Oct. 30, 2017, Diehl et al., "Security Agent", 10 pages.

Final Office Action for U.S. Appl. No. 13/728,746, dated Dec. 3, 2014, David F. Diehl, "Real-Time Representation of Security-Relevant System State", 22 pages.

Office action for U.S. Appl. No. 14/709,779, dated Feb. 23, 2016, Diehl et al., "Kernel-Level Security Agent", 14 pages.

Office Action for U.S. Appl. No. 13/728,746, dated Apr. 14, 2014, David F. Diehl, "Real-Time Representation of Security-Relevant System State", 17 pages.

Office action for U.S. Appl. No. 15/393,797, dated Apr. 18, 2017, Diehl et al., "Security Agent", 15 pages.

(56) References Cited

OTHER PUBLICATIONS

Office Action for U.S. Appl. No. 13/492,672, dated Apr. 7, 2014, David F. Diehl, "Kernel-Level Security Agent", 8 pages.
Office action for U.S. Appl. No. 14/140,323, dated May 11, 2016, Diehl et al., "Kernel-Level Security Agent", 15 pages.
Office Action for U.S. Appl. No. 15/483,153, dated Jun. 29, 2017, Diehl et al., "Kernel-Level Security Agent", 12 pages.
Office Action for U.S. Appl. No. 14/140,323, dated Jul. 31, 2015, David F. Diehl, "Kernel-Level Security Agent", 9 pages.
Office action for U.S. Appl. No. 14/709,779, dated Aug. 12, 2016, Diehl et al., "Kernel-Level Security Agent", 7 pages.
The PCT Search Report and Written Opinion dated Apr. 28, 2015 for PCT application No. PCT/US2015/013522, 13 pages.
The PCT Search Report and Written Opinion dated Apr. 29, 2014 for PCT application No. PCT/US13/75856, 13 pages.
The PCT Search Report and Written Opinion dated Sep. 17, 2013 for PCT application No. PCT/US2013/040420, 12 pages.
Translated Singapore Office Action dated Sep. 28, 2015 for Singapore patent application No. 11201407292Q, a counterpart foreign application of U.S. Pat. No. 9,043,903, 6 pages.
The European Office Action dated Feb. 19, 2020 for European Patent Application No. 13808592.3, a counterpart of U.S. Pat. No. 9,292,881, 4 pages.
Non Final Office Action dated Mar. 2, 2020 for U.S. Appl. No. 16/007,507 "Security Agent", Diehl, 11 pages.
Non Final Office Action dated Jan. 24, 2020 for U.S. Appl. No. 16/408,180 "Integrity Assurance and Rebootless Updating During Runtime" Ionescu, 8 pages.
Final Office Action dated Jun. 1, 2020 for U.S. Appl. No. 16/408,180, "Integrity Assurance and Rebootless Updating During Runtime", Ionescu, 9 pages.
The Extended European Search Report dated Jun. 2, 2020 for European Patent Application No. 20172990.2, 8 pages.

\* cited by examiner

KERNEL- AND USER-LEVEL COOPERATIVE SECURITY PROCESSING

CROSS-REFERENCE TO RELATED APPLICATIONS

Reference is made to commonly assigned, co-pending U.S. application Ser. No. 15/438,553, filed Feb. 21, 2017, the entirety of which is incorporated herein by reference.

BACKGROUND

In order to protect a host computing system against malicious software—often called "malware"—that can steal or destroy system resources, data, and private information, security software configured to guard against such threats is often implemented in both a kernel mode and a user mode of the host computing system. On at least some occasions, a kernel-level security component may need to send data to a user-level security component, or vice versa, such as to communicate events from one component to the other.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features. For brevity of illustration, in the diagrams herein, an arrow beginning with a diamond connects a first component or operation (at the diamond end) to at least one second component or operation that is or can be included in the first component or operation.

DETAILED DESCRIPTION

Overview

Figure 1:
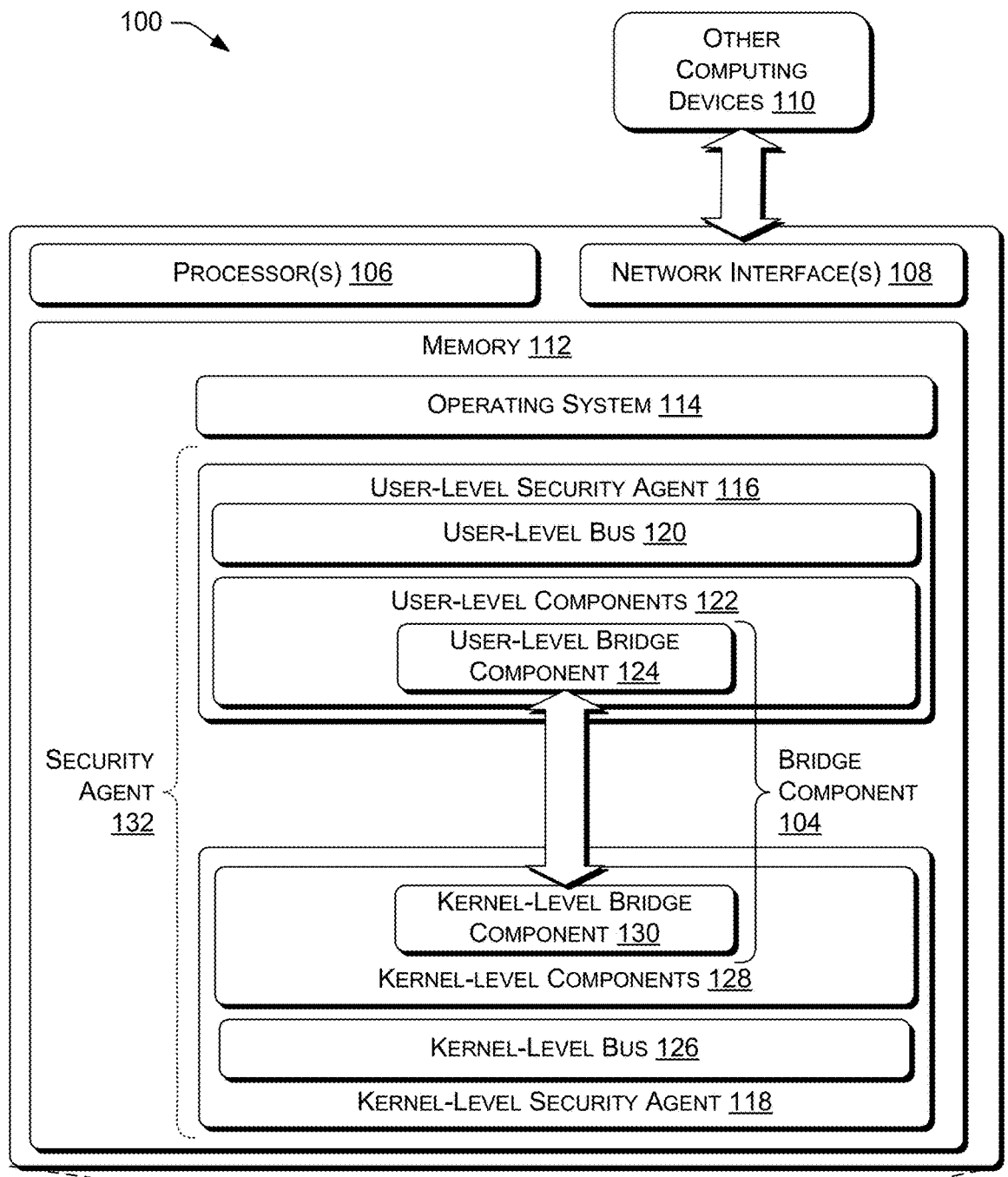
FIG. 1 illustrates an example computing device configured with a bridge component that enables communications between a kernel mode and a user mode of the computing device.

This disclosure describes, in part, a bridge component (often referred to herein simply as a "bridge component") that creates an interface to send data between a pair of components, called "endpoints" (or "endpoint components"), a first endpoint component of the pair being executed in a kernel mode of a computing device, and a second endpoint component of the pair being executed in a user mode of the computing device. Said another way, the bridge component represents logic for sending messages carrying data between user mode and kernel mode of the computing device on which the bridge component is implemented. In some embodiments the components that are involved in communicating data between the kernel mode and the user mode comprise security components that are part of an installed security software program on the computing device.

The code base for some prior security software—especially with respect to the source code for enabling communication between kernel-level and user-level components—can vary greatly depending on the type of operating system (OS) employed by the host computing system. This is at least partly due to different techniques used by different types of OS's for enabling communication between kernel-level and user-level components. For instance, some types of OS's load kernel-level components before loading user-level components, while other types of OS's load user-level components before loading kernel-level components, and the source code for allowing communication between kernel-level and user-level components typically must account for this loading order. This presents a problem because an OS-specific code base for security software must be implemented for each of the multiple available types of OS's on the market in order to enable communications between kernel-level and user-level security components.

Even for a given type of OS, the manner of communicating data from user mode to kernel mode may differ from the manner of communicating data in the opposite direction (i.e., from the kernel mode to the user mode). Thus, some prior schemes, in addition to requiring an OS-specific code base for installed security software, must also implement a code base that is asymmetric, meaning different source code is used to enable communication of data from the kernel mode to the user mode, as compared to the source code that enables communication of data in the opposite direction (i.e., from the user mode to the kernel mode).

The bridge component can be implemented partially in the user mode and partially in the kernel mode of the computing device. In some examples, the bridge component exposes an application programming interface (API) that is symmetrical with respect to the user mode-kernel mode demarcation in the computing device. In other words, the bridge component allows its client components to avoid having to make any distinction between the user mode and the kernel mode of the computing device it is implemented on by exposing a common set of APIs for communication of data between kernel mode and user mode in both directions. In this sense, the bridge component introduces a standard messaging API in order to hide the complexity of any asymmetry created by the underlying OS and/or mode (user mode or kernel mode). The bridge component also removes the requirement for consuming code to sequence startup operations between user mode components and kernel mode components.

The bridge component can be implementable on computing devices that employ any type of OS; the bridge component, in turn, can expose a cross-platform interface that does not vary across different types of OS's.

The bridge component includes a set of APIs for calling various functions to create, modify, and/or destroy objects, and/or to invoke methods on objects, which enables the sending of data between a kernel-level component and a user-level component executing on a computing device. Such objects may include, without limitation, communication ports, messages, and message buffers. In some implementations a technique for sending data between a kernel-level component and a user-level component executing on a computing device involves opening a communications port for sending data originating from a first endpoint component to a second endpoint component. The first endpoint component can be executable in a kernel mode of the computing device, while the second endpoint component can be executable in a user mode of the computing device, or vice versa (i.e., communication of data can occur in both directions across the user mode-kernel mode demarcation). The opened communications port may then be set to a connected state, and in response to opening the communications port and setting the communications port to the connected state, the technique may continue by sending a message containing the data originating from the first endpoint via the communications port, whereby the second endpoint may receive the data. In some embodiments, one of the endpoint components can be attached to a kernel-level bus of a kernel-level security agent executing in the kernel mode, while the other endpoint component can be attached to a user-level bus of a user-level security agent executing in the user mode.

Also disclosed herein are systems and devices comprising one or more processors and one or more memories, as well as non-transitory computer-readable media storing computer-executable instructions that, when executed, by one or more processors perform various acts and/or techniques disclosed herein.

The symmetric and cross-platform characteristics of the bridge component according to some examples described herein allow the bridge component to be implemented on any computing device that employs any type of OS. Therefore, the bridge component can be used to allow kernel-level and user-level components, such as security components, to communicate with each other, and the bridge component exposes an API, or a set of APIs, that can be utilized across various platforms. Furthermore, because the bridge component's exposed interface is agnostic to the order in which the components are loaded with respect to the user mode and the kernel mode of the computing device, the logic of client components using the bridge component can be simplified, as compared to logic that accounts for the loading order of components. This simplified interface between the user mode and the kernel mode of the computing device can be utilized for communicating security-related data (such as observed events) between the two modes, which can be vital for the efficacy of a related security program in guarding against threats from malware. Although many of the examples described herein describe endpoint components that are part of a security agent executing in either the kernel mode or the user mode, it is to be appreciated that the bridge component described herein is usable with any type of components, such as non-security related components, without changing the basic characteristics of the bridge component. Thus, the techniques and systems described herein can be extended outside of the security realm to allow communication between any pair of endpoint components, one component being in the user mode and the other component being in the kernel mode.

Throughout this application, the term "process" refers to an identifiable unit of execution on a computing device. The term "process" encompasses not only traditional OS processes (identified by a process ID, PID), but also threads, lightweight processes (LWPs), or process groups (e.g., identified by a process-group ID, PGID). Moreover, a "process" can include malware that has removed itself from the OS process queue but whose thread(s) are still eligible for scheduling. This is a technique used, e.g., by WINDOWS malware to increase the difficulty of terminating the malware.

Furthermore, the term "process" also encompasses specific software modules or groups of modules executed in an OS process, thread, LWP, or other execution unit noted above. For example, a buffer-overflow attack may cause a thread to stop running its original code and start running malicious code. The original code running in the thread can be considered a "process," and the malicious code running in the thread after the attack can be considered another "process." In some examples, some OSes maintain a thread pool for servicing device-driver interrupts. When data is received over a network, a USB device is connected to a computer, or another interrupt-triggering event takes place, the OS can run code specific to that interrupt in a thread of the thread pool. The code for a particular interrupt running in a particular thread can be considered a "process." In some examples, some OSes respond to interrupts in the context of the thread that was executing at the time the interrupt was serviced, regardless of whether that thread is a user- or kernel-level thread. That thread running its normal code can be considered a "process," and that thread running interrupt code can be considered another "process."

Some examples herein operate with respect to a proper subset of the types of "process" listed in the preceding two paragraphs. For example, references herein to "detecting an event associated with a process," in some nonlimiting examples, may refer to detecting an event associated with only an OS process, or only a thread, or only an OS process or thread, or only a module running in an OS process or thread. In addition to the described embodiments relating to a "process," this application includes embodiments in which "process" is replaced by any combination of fewer than all of the types of "process" listed in the preceding two paragraphs.

Example techniques described herein may refer to processes and modules running on a computing device, e.g., in the context of detecting activities of malware or of attackers. However, the techniques may also apply to other non-malicious software, processes, or other system components. For example, techniques described herein can be used in determining relationships between processes or threads, or in analyzing causes of excess resource usage by processes. Accordingly, techniques discussed herein for filtering events may be used by, among others, anti-malware security researchers, white-hat vulnerability researchers, or other analysts of events. In some examples, events can be associated with various system components, e.g., data streams; processes; operating systems; files; memory regions; central processing units (CPUs) or cores thereof, network interfaces or other communications devices; peripherals; fixed or removable storage devices; or add-in cards.

Some examples herein permit analyzing a data stream including data stored in, e.g., a file, a disk boot sector or partition root sector, or a block of memory, or a portion thereof. For brevity, the term "sample" herein refers to a data stream, or a portion of a data stream being analyzed separately from at least one other portion of the data stream. A sample can include, e.g., an individual malware file, a user file such as a document, a benign executable, or a malware-infected user file. In some examples of a data stream representing a multi-file archive (e.g., ZIP or TGZ), an individual file within the multi-file archive can be a sample, or the archive as a whole can be a sample.

Throughout this document, "dirty" is used to refer to data streams associated with malware, feature vectors representing such data streams, or other values associated with, produced by, or indicative of malware or malicious behavior. "Clean" is used to refer to data streams or values not associated with, produced by, or indicative of malware or malicious behavior. A "false detection" or "false positive" is a determination that a data stream is associated with malware when, in fact, that data stream is not associated with malware, or the data stream that is the subject of such a determination. A "false miss" or "false negative" is a determination that a data stream is not associated with malware when, in fact, that data stream is indeed associated with malware, or the data stream that is the subject of such a determination.

A sample, e.g., an executable file or other data stream, can be associated with malware if, e.g., the data stream is itself, or includes, malicious code; the data stream is (or is likely) at least a portion of a grouping of malicious code (e.g., a formerly-benign file that has been modified by a file infector virus); the data stream is, or is output by, a generator commonly used for generating malware (e.g., a packer or installer); or the data stream is an input file relied on by malware (e.g., a large sequence of data designed to trigger a buffer overflow that will permit remote code execution, or shellcode embedded in a document file). In an example of generators, a data stream may include a decruncher that decompresses data from a file into RAM. A decruncher itself may be entirely benign. However, the decompressed data may be or include executable code of a malicious program, dynamic-link library (DLL), or other computer-executable module. Accordingly, a decruncher commonly used to compress malicious code, or compressed malicious code itself, may be associated with malware.

Some generators are used for malware, and are also used for legitimate software. A determination that a data stream is associated with malware does not necessarily require or guarantee that the data stream in fact be malware. In some examples, determinations herein (e.g., at blocks 610, 810, 1010, 1104, 1210, or 1310) can be used by a security analyst in triaging data streams, and can permit the security analyst to readily separate data streams based on a likelihood they are in fact malware. In some examples, a computer-security system can delete or quarantine files associated with malware, or terminate processes launched from data streams associated with malware.

In some examples, malware comprises malicious data instead of or in addition to malicious code. Such data is also considered to be associated with malware. For example, some programs may have bugs that prevent them from correctly processing certain inputs. Examples include Structured Query Language (SQL) injection attacks, in which a benign program populates a query with unescaped external data. For example, the query template "SELECT rating FROM MindBlowingMusic WHERE artist LIKE '%{$name}%';" is clean when provided with clean data to be populated in place of the placeholder "{$name}", such as $name="Mike Oldfield". However, this query can be abused by providing malicious data. When the malicious data $name="foo'; DROP TABLE MindBlowingMusic; --" is substituted into the query template, for example, the resulting query will cause the "MindBlowingMusic" table of the database to be deleted ("dropped"), causing unexpected loss of data. In another example, malicious data can include malformed UTF-8 (Unicode Transformation Format—8 bit) that causes a buggy UTF-8 processing routine to enter an unexpected or erroneous state. In still another example, malicious data can include data that is too large or too complicated for a processing routine to handle, e.g., a Christmas-tree packet. Such data can trigger buffer overflows or other vulnerabilities within processing routines. Data designed to trigger or exploit vulnerabilities is associated with malware.

Except as expressly indicated otherwise, a determination of whether a data stream is associated with malware is carried out programmatically by or using catalogs or other techniques herein. Various examples herein can be performed without human judgment of whether a program or data block is in fact malicious. Techniques herein can permit more readily identifying potential computational threats, e.g., in the context of an antivirus program, remote security system (e.g., a cloud security service), or on-premises security appliance.

Illustrative Configurations

FIG. 1 illustrates an environment 100 including an example computing device 102 having implemented thereon a bridge component 104 (often referred to herein simply as a "bridge") that enables communications between a kernel mode and a user mode of the computing device 102. In various embodiments, the computing device 102 may be, or include, a server or server farm, multiple, distributed server farms, a mainframe, a work station, a personal computer (PC), a laptop computer, a tablet computer, a personal digital assistant (PDA), a cellular phone, a media center, an embedded system, or any other sort of computing device or devices. In some implementations, the computing device 102 represents one or more virtual machines implemented on one or more computing devices.

The computing device 102 may include one or more processors 106 and one or more network interfaces 108. The processor(s) 106 may be, or include, any sort of processing unit, such as a central processing unit (CPU) and/or a graphic processing unit (GPU). The network interface(s) 108 allow the computing device 102 to communicate with one or more other computing devices 110. In some embodiments, the other computing device(s) 110 can represent a remote security system, such as a security system implemented in the "Cloud" on a set of remotely located devices that provide security services to the computing device 102. For example, a remote security system may receive notifications of observed events from the computing device 102, may perform analysis of data associated with those events, may perform healing of the computing device 102, and may generate configuration updates and provide those updates to the computing device 102. These interactions between the computing device 102 and the remote security system enable, among other things, a detection loop aimed at defeating a malware update loop of malware developers (also referred to as "adversaries").

The network interface(s) 108 may send and receive communications through one or more networks, and may support both wired and wireless connection. Such network(s)

may be include, without limitation, wired networks, wireless networks, and combinations of wired and wireless networks, any one or combination of multiple different types of public or private networks (e.g., cable networks, the Internet, wireless networks, etc.). In some instances, the computing device 102 is configured to communicate via the network interface(s) 108 using a secure protocol (e.g., https) and/or any other protocol or set of protocols, such as the transmission control protocol/Internet protocol (TCP/IP).

The computing device 102 may include non-transitory tangible computer-readable memory 112, or other computer-readable memories, which may store an array of modules and data, and may include volatile and/or nonvolatile memory, removable and/or non-removable media, and the like, which may be implemented in any method or technology for storage of information, such as computer-readable instructions, data structures, program modules, or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device.

The computing device 102 may include or implement an OS 114, as well as a user-level security agent 116, and a kernel-level security agent 118, each being shown stored in the memory 112 and executable by the processor(s) 106. The user-level security agent 116 and the kernel-level security agent 118 may represent at least a portion of a security program installed on the computing device 102. In some embodiments, at least the kernel-level security agent 118 may load before the OS 114 of the computing device 102, sometimes very early in the boot-time of the computing device 102, such as by some of the first few dozen instructions. In some embodiments, either or both of the kernel-level security agent 118 and/or the user-level security agent 116 are installed on the computing device 102 in the form of a driver and may be received from a remote security system, e.g., via WINDOWS UPDATE or a similar secure update mechanism; in the form of signed JAR or RPM files, or other bundles used by a package management system; or via a secure protocol (e.g., scp, ftps, sftp, or https) permitting an already-installed kernel-level security agent 118 to retrieve or receive an updated version of agent 116 or 118, which kernel-level security agent 118 will then install.

Examples of OSes 114 can include WINDOWS, GNU/LINUX, GNU/HURD, QNX, BSD, SYSTEM V, or systems built on microkernels such as MACH. An OS 114 can include at least one of: a kernel; a system-call mechanism (e.g., via interrupts, traps, or a sysenter or other dedicated instruction); a library providing a programming language wrapping for system calls (e.g., functions in the UNIX manual, section 2, or in WINDOWS's KERNEL32.DLL); or a standard library (e.g., the C standard library, or WINDOWS msvcrt).

As shown in FIG. 1, the user-level security agent 116 may include a user-level bus 120, and one or more user-level components 122 attached to the user-level bus 120. At least one of the user-level components 122 includes a user-level bridge component 124, which is a part of the bridge component 104 that is executed in the user mode of the computing device 102.

The kernel-level security agent 118 may include a kernel-level bus 126, and one or more kernel-level components 128 attached to the kernel-level bus 126. At least one of the kernel-level components 128 includes a kernel-level bridge component 130, which is a part of the bridge component 104 that is executed in the kernel mode of the computing device 102.

In general, the components 122, 128 of both the user-level security agent 116 and the kernel-level security agent 118 may be configured to observe events and determine actions to take based on those events, potentially with the assistance of a remote security system. In addition, the OS 114 may include hooks or filter drivers that allow other processes, such as the user-level security agent 116 and/or the kernel-level security agent 118 to receive notifications of the occurrence or non-occurrence of events.

Example events can include, without limitation, file creates, reads and writes, launching of executables, or events that occur in the user mode of the computing device 102, such as, without limitation, rendering of display graphics for display on a display screen of the computing device 102, etc. For example, at least some of the components 122, 128 may include "collectors" that receive notifications of semantically-interesting events (e.g., file writes and launching executables) from the OS's 114 hooks or filter drivers, from user-mode event monitors, kernel-mode event monitors, and/or from threads monitoring log files or memory locations.

Other of the components 122, 128 may include "correlators" that note the fact of the occurrence of events, sometimes after filtering the semantically-interesting events down to a subset of events. Yet other of the components 122, 128 may include "actors" that may, among other things, gather forensic data associated with an event and update a situational model of the user-mode security agent 116 and/or the kernel-level security agent 118 with the forensic data. Such a situational model can represent chains of execution activities and genealogies of processes, tracking attributes, behaviors, or patterns of processes executing on the computing device 102, enabling an "event consumer" component 122, 128 to determine when an event is interesting from a security standpoint. Events may include both actions performed by processes and non-occurrence of expected actions. For example, a collector component 122, 128 may register with a hook or filter driver offered by the OS 114 to receive notifications of the occurrence or non-occurrence of certain events, such as file creates, reads, or writes, or loading of executables.

In some instances, the computing device 102, or any sub-components thereof, may have features or functionality in addition to those that FIG. 1 illustrates. For example, the computing device 102 may also include additional data storage devices (removable and/or non-removable) such as, for example, magnetic disks, optical disks, or tape. The additional data storage media may include volatile and nonvolatile, removable and non-removable media implemented in any method or technology for storage of information, such as computer readable instructions, data structures, program modules, or other data. In addition, some or all of the functionality described as residing within the computing device 102 may reside remotely from the computing device 102, in some implementations.

In some examples, a security agent 132 includes user-level security agent 116 and kernel-level security agent 118. In some examples, user-level security agent 116 and kernel-level security agent 118 are distributed and updated together; in other examples, either of user-level security agent 116 or kernel-level security agent 118 can be distributed or updated without the other. In the illustrated example and other examples herein, two buses are shown: user-level bus 120 and kernel-level bus 126. However, this is not limiting. In some examples, more than two buses are used. Any pair of buses can be connected using a bridge component 104 connected to the buses in that pair. In some examples using more than two buses, bridge components 104 are provided so that each bus can communicate messages to each other bus (a complete graph having n buses and n(n−1)/2 bridges). In some examples using n>2 buses, the number of bridge components 104 is less than n(n−1)/2, i.e., the two buses in at least one pair of buses are not connected by a bridge component 104.

Figure 2:
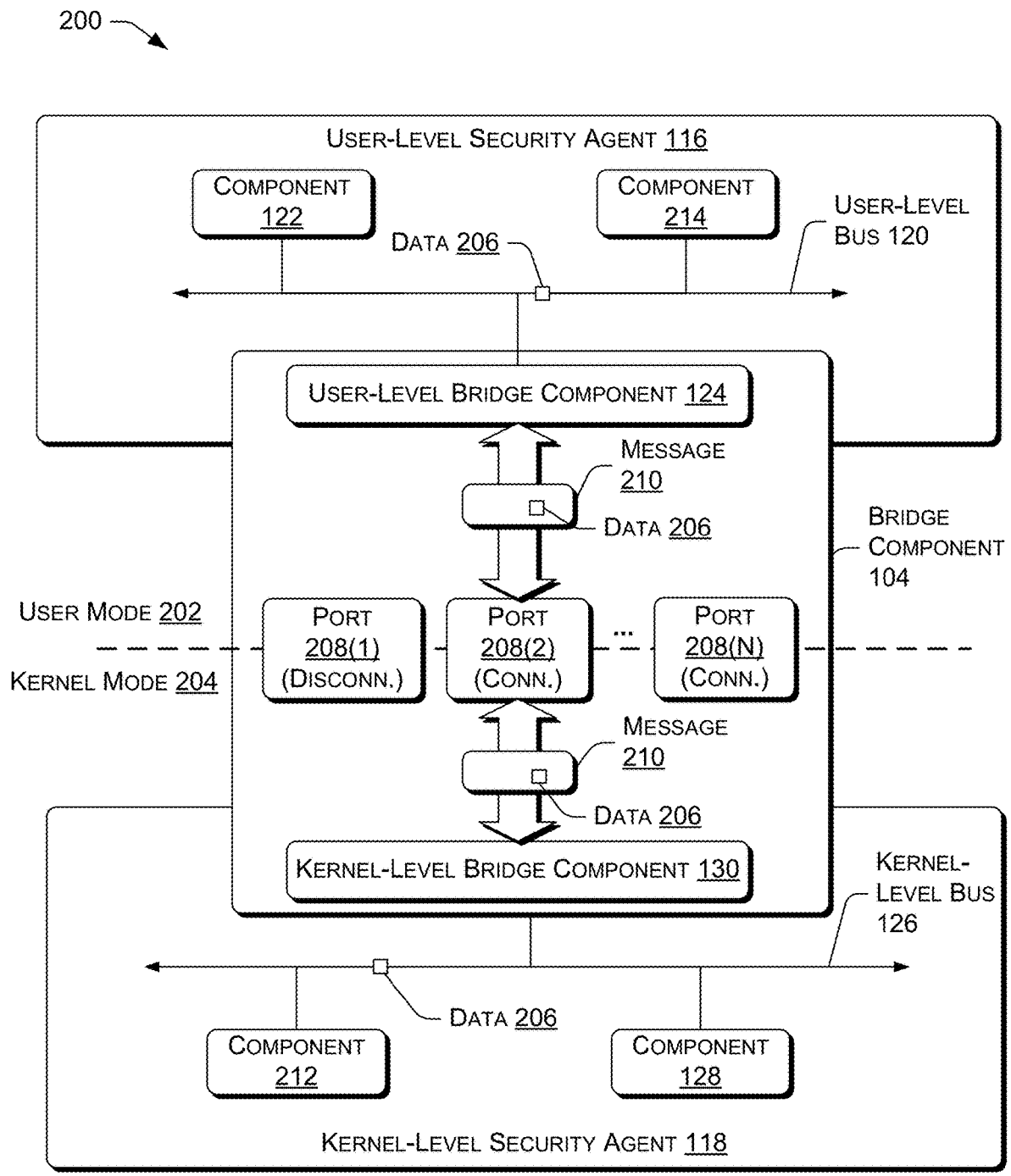
FIG. 2 illustrates a more detailed example architecture of the bridge component of FIG. 1 that allows for communication between components of a user-level security agent and a kernel-level security agent.

FIG. 2 illustrates a more detailed, example architecture 200 of components of security agent 132, including the bridge component 104 in use with the user-level security agent 116 and the kernel-level security agent 118. As illustrated, the user-level security agent 116 is executed in a user mode 202 of the computing device 102, while the kernel-level security agent 118 is executed in a kernel mode 204 of the computing device 102. The user mode 202 and kernel mode 204 correspond to protection domains—also known as rings—that protect data and functionality of the computing device 102 from faults and malware. Typically, a user mode, such as user mode 202, is associated with the outermost ring and the least level of privileges to access memory and functionality. This ring is often referred to as "ring 3" and includes many application processes. A kernel mode, such as kernel mode 204, is associated with an inner ring (sometimes the innermost ring, although in modern computing devices there is sometimes an additional level of privilege, a "ring −1") and a higher level of privileges to access memory and functionality. This ring is often referred to as "ring 0" and typically includes OS 114 processes. However, the kernel mode 204 can refer to ring 1, ring 2, or another level of hardware-enforced privilege the user mode 202 does not possess.

Each of the buses 120, 126 of the respective security agents 116 and 118 represents a delivery vehicle that, within its respective mode (e.g., user mode 202 or kernel mode 204) facilitates the routing or delivery of events between different components 122, 128 attached to the bus 120, 126. In some instances, it may be useful for a user-level component 122 to send data 206 (e.g., data associated with an event) to a kernel-level component 128, or vice versa. Data 206 can include, or be an example of, a data stream. The bridge component 104 can be utilized to enable the communication of data 206 between respective components 122, 128 attached to the kernel-level bus 126 and the user-level bus 120. This can permit the user-level bus 120 and the kernel-level bus 126 to be individually unaware of the other bus's existence, in some examples, which can reduce coupling between them and therefore increase robustness.

The "buses" 120, 126 represent one exemplary type of component, e.g., software component, that can be instantiated in each of the respective modes, and that other types of components or mechanisms are contemplated in lieu of using a "bus". For instance, the functions of the buses 120, 126 described herein can, in some implementations, be carried out by one or more of the components 122, 128, without the use of a bus.

As mentioned, the bridge component 104 includes a set of application programming interfaces (APIs) for calling various functions to create, modify, and/or destroy objects, and/or to invoke methods on objects, which facilitates the sending of data 206 between a kernel-level component 128 and a user-level component 122. Such objects may include, without limitation, communication ports 208(1), 208(2), ..., 208(N) (collectively 208), and messages 210.

As used herein, components 122, 128 exchanging data 206 via communication ports 208 are called "endpoints" or "endpoint components."

For example, a first endpoint component 212 (which can represent a component 128) of the kernel-level security agent 118 may provide data 206 on the kernel-level bus 126 to which the component 212 is attached. This data 206 can represent any suitable data, such as data associated with an event that is to be consumed (or otherwise received) by one or more other components 122. The consumer components 122 may include one or more components 128 of the kernel-level security agent 118 and/or one or more components 122 of the user-level security agent 116. In some embodiments, the kernel-level bridge component 130 may be configured to detect data 206 that is to be sent to a user-level component 122. The kernel-level bridge component 130 may observe all data 206 provided on the kernel-level bus 126 and a configuration may specify one or more criteria for sending particular data 206 (e.g., data 206 associated with particular events that satisfy the criteria) to the user-level components 122.

Before data 206 originating from the first endpoint component 212 in the kernel mode 204 can be communicated to a second endpoint component 214 (which can represent a component 122) in the user mode 202, a communications port 208, such as the communications port 208(2), is opened and connected by the bridge component 104 (and/or by endpoints 122, 128, 212, 214 utilizing the bridge component 104). Communication port 208(2) acts as a communication medium to communicate the data 206 between the endpoints 212 and 214. A communications port 208, such as the communication port 208(2), is configured to facilitate the exchange of data 206 (e.g., simple buffers) between two endpoint components 122, 128 (one endpoint component 214 in the user mode 202, and the other endpoint component 212 in the kernel mode 204).

As shown in FIG. 2, an opened port 208 can be in a disconnected state or a connected state. For example, the port 208(1), although opened, is shown as being in the disconnected ("Disconn.") state, whereas the ports 208(2) and 208(N) are shown as being in the connected ("Conn.") state. Messages 210 can be passed over a communications port 208 that is set to the connected state, while messages 210 cannot be passed over a communications port 208 that is set to the disconnected state.

In some embodiments, a communication port 208 supports a one-to-one communication between endpoints 122, rather than a one-to-many or many-to-1 communication. In some examples, a communications port 208 can facilitate communication in either direction across the user mode-kernel mode demarcation, such that the data 206 can originate from a first endpoint component 122 in the user mode 202 and can be received by a second endpoint component 128 in the kernel mode 204, or vice versa. Because the bridge component 104 exposes a symmetric interface, in some examples, the descriptions herein that describe sending data 206 between endpoints 122 in a particular direction across the user mode-kernel mode demarcation also apply to sending data 206 in the opposite direction.

In some examples, the buses 120, 126 are implemented at least partly using respective software modules executable by processor 106, FIG. 1. In some examples, each of those modules includes logic to determine how messages are routed on the respective bus 120, 126. The logic can be independent of the generation of messages by components 122, 128, which can permit updating buses 120, 126 independently of components 122, 128. This can increase flexibility and system reliability. This can also permit sharing at least some logic between bus 120 and bus 126. For example, the logic can include a routine that parses a routing table. The parsing routine can be the same for both bus 120 and bus 126, and the routing tables can differ between the buses 120, 126.

In some examples, the logic for bus 120 can determine that messages on user-level bus 120 intended for a kernel-level component 128 should be routed to user-level bridge component 124. User-level bridge component 124 can then pass any message it receives to kernel mode 204 via a port 208. Kernel-level bridge component 130 can receive the message via the port 208 and submit the message for routing on the kernel-level bus 126.

Similarly, the logic for bus 126 can determine that messages on kernel-level bus 126 intended for a user-level component 122 should be routed to kernel-level bridge component 130. Kernel-level bridge component 130 can then pass any message it receives to user mode 202 via a port 208. User-level bridge component 124 can receive the message via the port 208 and submit the message for routing on the user-level bus 120.

The operations described in the preceding three paragraphs can permit the logic for each bus 120, 126 to operate without specific knowledge of the configuration of the other bus 120, 126. This can improve robustness of each bus 120, 126 and of security agent 132 as a whole. This can also permit individually updating code for buses 120, 126 or components 122, 128, which can increase the resistance of security agent 132 to attacks.

Opening a Port 208:

Either of the bridge components 124 or 130 (or an endpoint 122 utilizing the bridge component 104) can initiate the opening of a communications port 208 by calling a particular "port opening" function to invoke or activate the function. An example Function (1), suitable for opening a communications port 208, is shown below:

---
Function (1)
---
```
typedef LONGLONG CS_PORT, *PCS_PORT;
NTSTATUS
CsPortOpen (
 _out PCS_PORT Port,
 _in CS_PORT_ID PortId,
 _in_opt ULONG_PTR PortContext,
 _in PCS_CONNECT_CALLBACK ConnectCallback,
 _in PCS_MESSAGE_SENT_CALLBACK MessageSentCallback
);
```
---

In Function (1), "Port" represents a returned port handle that can be used for send and receive operations via the port 208; "PortID" supplies the port identifier of the port 208 to be opened; "PortContext" is an optional context provided to the callbacks associated with the port 208; "ConnectCallback" is a callback provided by the caller (e.g., the bridge component 124 or 130, or the endpoint 122 utilizing the bridge component 104), and the "ConnectCallback" function is activated in response to a port 208 being set to the connected state (see below for more detail); and "MessageSentCallback" is a callback provided by the caller (e.g., the bridge component 124 or 130, or the endpoint 122 utilizing the bridge component 104) that is activated in response to a queued message 210 (described in more detail below) being sent, timing out, or failing to send.

The port identifier of the port 208 that is assigned in response to activating Function (1) may comprise a unique identifier of the port 208 that differentiates the port 208 from other communications ports 208 that have been opened via activation of Function (1). For example, the communications port 208(2) may have a port identifier that is unique with respect to the port identifiers of all of the other ports 208(1) and 208(3)-(N) that have been opened by the bridge component 104. Accordingly, the port identifier of a given port 208, such as the port 208(2), uniquely identifies a communication relationship between two endpoint components 122 across the user mode-kernel mode demarcation, such as a relationship between a first endpoint component 212 in the kernel mode 204 and a second endpoint component 214 in the user mode 202. This design allows an endpoint component 122 to use multiple port identifiers, as needed, to avoid complexity of multiplexing unrelated communication streams over a single port 208. For instance, a first port identifier of a first port 208(1) can be used by a component 212 for a first application, and a second port identifier of a second port 208(2) can be used by the same component 212 for a second application.

In addition, use of a given port identifier can be restricted to use by no more than two endpoint components 122 (one being a kernel-level component 128 and one being a user-level component 122) at the given time, notwithstanding the fact that multiple threads managed by the same endpoint component 122 can concurrently access the same port 208 having a particular port identifier. In some embodiments, the unique port identifier of a given port 208, such as the port 208(2), is predetermined (e.g., pre-shared knowledge) for both endpoint components 122 that are to communicate via the port 208(2). For instance, the port identifier of the port 208(2) can be predetermined by selecting the port identifier at compile time for a given pair of endpoint components 122, by communicating the port identifier through an out-of-band mechanism to the pair of endpoint components 122 (or to the bridge components 124 and 130), or any other suitable mechanism for predetermining the port identifier. In some embodiments, a given port identifier is not reused for a duration of a single system boot (i.e., is not reused until the next system boot).

The call of Function (1), above, can return with multiple possible return codes including, without limitation, a "STATUS_SUCCESS" return code, and an error code, the error code being returned in all other cases besides the "STATUS_SUCCESS" return code. The "STATUS_SUCCESS" return code indicates that the communications port 208 has been initialized from the calling side. For example, if the kernel-level bridge component 130 (or an endpoint 128 utilizing the bridge component 104) called Function (1) to request that the communications port 208(2) be opened, a return code of "STATUS_SUCCESS" indicates that the port 208(2) has been initialized from the kernel mode 204. Likewise, if the user-level bridge component 124 (or an endpoint 122 utilizing the bridge component 104) called Function (1), and "STATUS_SUCCESS" was returned, this would indicate that the port 208(2) has been initialized from the user mode 202. The "STATUS_SUCCESS" return code can also indicate that the port 208 has been set to a "waiting state" until Function (1) is activated from the other side of the user mode-kernel mode demarcation.

Connecting a Port 208:

A port 208 can be set to a connected state in response to both of the bridge components 124 and 130 (or a pair of endpoints 122 and 128 utilizing the bridge component 104) having called Function (1), which invokes the "ConnectCallback" function, as introduced with reference to Function (1). This "ConnectCallback" function is invoked/activated each time a port 208 is set to the connected state. For instance, port 208(2) may have been initialized by the kernel-level bridge component 130 (or a kernel-level endpoint 128 utilizing the bridge component 104) having activated Function (1) before the user-level bridge component 124 (or a user-level endpoint 122) activates Function (1) from the user mode 202, thereby placing the port 208(2) in a "waiting state" and/or an opened, but disconnected state. At this point in time, the return code of Function (1) can be provided to the kernel-level bridge component 130 (or the corresponding kernel-level endpoint 128) to open the port 208(2).

However, the port 208(2) will not be set to the connected state until a later point in time when the user-level bridge component 124 (or the corresponding user-level endpoint 122) activates Function (1) in the user mode 202. In response to this second activation of Function (1) in the user mode 202 (the first activation of Function (1) having previously occurred in the kernel mode 204), the port 208(2) can be set to the connected state. It is to be appreciated that, in this scenario, the "ConnectCallback" function may be invoked/activated before a return code of Function (1) is received by the user-level bridge component 124 (or by the corresponding user-level endpoint 122) because the kernel-level bridge component 130 (or the corresponding kernel-level endpoint 128) has already opened the port 208(2) and set the port 208(2) to the waiting state.

In some examples, the "ConnectCallback" function may be invoked in the same thread context as the thread context in which the port 208 was opened if the port 208(2) has already been opened from the other side (i.e., the user mode 202 or the kernel mode 204) when the calling component 122 activates Function (1). In some examples, the "ConnectCallback" function may be invoked in a different thread context than the thread context in which Function (1) was called, such as when the port 208(2) is opened from the other side before a return code of Function (1) is received by the calling bridge component 124 or 130 (or by the corresponding endpoint 122).

In some examples, a port 208 is opened and connected in a symmetric fashion with respect to both the user mode 202 and kernel mode 204. This enables the bridge component 104 to be implemented on computing devices 102 that employ different types of OS's 114, which may load or initialize components in different orders with respect to whether the components are in the user mode 202 or the kernel mode 204. For example, some types of OS's 114 load components 128 in kernel mode 204 before the components 122 in user mode 202 are loaded, while other types of OS's 114 load components 122 in user mode 202 before the components 128 in kernel mode 204 are loaded.

An example of the aforementioned "ConnectCallback" function, suitable for setting a communications port 208 to a connected state, is shown below as Function (2):

---
Function (2)
---
typedef
VOID
(*PCS_CONNECT_CALLBACK) (
  _in CS_PORT Port,
  _in CS_PORT_ID PortId,
  _in_opt ULONG_PTR PortContext
);
---

In Function (2), "Port" is the port handle retrieved by the Function (1) call; "PortID" is the port identifier of the port 208 supplied in the corresponding Function (1) call; "PortContext" is an optional opaque value defined by the calling endpoint 122 and provided by the calling component 122 of Function (1).

Closing a Port 208:

A port 208 can be closed at any time by either endpoint 122 of a pair of endpoints 122 (one being in user mode 202, and the other being in kernel mode 204). An endpoint 122 can be informed that the other endpoint 122 has closed the port 208 (causing the port 208 to be set to the disconnected state) at the next invocation of a communication operation (e.g., Send, Queue, or Receive) on the closed port 208. Such a communication call will return an appropriate error code (e.g. STATUS_CONNECTION_DISCONNECTED) to inform the caller (e.g., the endpoint 122, or the bridge component 124 or 130 utilized by the endpoint 122) that the port 208 is disconnected. An endpoint 122 may close its own side of the port 208 by invoking the example Function (3), shown below:

---
Function (3)
---
NTSTATUS
CsPortClose (
  _In_ CS_PORT Port
);
---

In Function (3), "Port" is an input parameter that corresponds to a previous invocation/activation of Function (1). The call of Function (3), above, can return with multiple possible return codes including, without limitation, a "STATUS_SUCCESS" return code, and an error code. The "STATUS_SUCCESS" return code indicates that the port 208 has been closed, and all pending operations or callbacks are complete or cancelled. The error code may indicate that the port 208 was not closed successfully, e.g. if the "Port" parameter of Function (3) is invalid. In response to closing the port 208, resources associated with the closed port 208 can be freed, and any racing callbacks on the port 208 can be finished.

Sending Data:

Data 206 that is to be sent from a first endpoint 122, such as the kernel-level endpoint 212, to a second endpoint 122, such as the user-level component 214, can be sent in a message 210 via the bridge component 104, as shown in FIG. 2. The data 206 may also be serialized as serialized data to create the message 210 for sending across the user mode-kernel mode demarcation. The serialized data can include a message buffer having a starting address and a length. In order to send a message 210, a function can be activated (e.g., called) and provided as input the starting address and the length of the message buffer holding message 210. Various examples include identification, ordering, and queueing of messages will be discussed, as well as management of serialized data, such as message buffers.

Message Identification:

Individual messages 210 can be assigned a unique message identifier. These message identifiers can be unique with respect to all messages 210 sent across a given port 208, such as the port 208(2), by a given component 122, 128 (e.g., endpoint). These message identifiers can also be assigned in a sequential, though asynchronous, fashion. However, in the case of asynchronous assignment of message identifiers, message identifiers may not represent the order that messages 210 are received by the bridge component 104, nor the order of delivery across the bridge component 104 to the other endpoint 122.

Because a message identifier may be assigned automatically to every message 210, the message identifier can be made available for use by an endpoint component 122 to uniquely represent an individual instance of a message 210. Furthermore, the message identifier of a given message 210 can be communicated across a port 208 so that both endpoints 122, 128 (one being in the user mode 202, and the other being in the kernel mode 204) receive the unique message identifier for a given message 210. The message identifier can therefore be made available for use by a pair of endpoints 122, 128 (one being in the user mode 202, and the other being in the kernel mode 204) to correlate messages 210 in a more complex protocol. It is to be appreciated that a particular message identifier is unique for a given port 208, such as the port 208(2), and a given endpoint 122, 128, such as the kernel-level endpoint 212, in some examples. Furthermore, two different ports 208 (e.g., the ports 208(1) and 208(2), with corresponding different port identifiers) can generate overlapping message identifiers with respect to each other, and, likewise, a pair of endpoints 122 on a single port 208 (one endpoint 122 being in user mode 202, and the other endpoint 128 being in kernel mode 204) can generate overlapping message identifiers with respect to each other. In some examples, a set of valid message identifiers excludes the value zero. In addition, messages 210 can be assigned a message identifier regardless of whether the message 210 is actually delivered to a receiving endpoint 122, 128, or whether the message times out without being delivered.

Message Ordering:

Messages 210 can be sent across a port, e.g., by bridge components 124 or 130, by activating a synchronous function (e.g., Port→SendMessage( )) or an asynchronous function (e.g., Port→QueueMessage( )). In some examples, a particular bridge component 124, 130 uses only the synchronous function, only the asynchronous function, or both functions. With regard to the synchronous function, non-overlapping synchronous messages 210 on a particular port 208 can be delivered in order, with increasing message identifiers. For example, if an endpoint 122 calls the synchronous function to send a first synchronous message 210(1), waits for the call to return, and then calls the synchronous function to send a second synchronous message 210(2), the second message 210(2) can be sent after the first message 210(1), and the second message 210(2) can have a strictly greater message identifier value than the message identifier value of the first message 210(1).

Again, with regard to the synchronous function, uninterrupted, non-overlapping synchronous messages 210 can be assigned sequentially increasing message identifiers. For example, if all messages 210 from a given endpoint 122 are delivered successfully, and the endpoint 122 performs no other send or queue activity on a given port 208 over which the messages 210 were successfully sent, then the message identifiers assigned to a sequence of non-overlapping invocations of the synchronous function can be sequentially increasing message identifiers (e.g., k, k+1, k+2, . . . ) in addition to being delivered in order with increasing message identifiers. Thus, an endpoint 122 can perform its own synchronization to ensure that a subsequent message 210(2) is not sent until the previous call of the synchronous function to send a previous message 210(1) has completed successfully (e.g., a return code indicating successful sending of the previous message 210(1) is received). Such synchronization can be accomplished, for example, by sending all sequenced messages 210 from a single thread, or by using a synchronization primitive (e.g., a lock) to ensure exclusive access to the port 208 in a multithreaded sequenced scenario.

It is to be appreciated that two or more messages 210 sent via overlapping calls of the synchronous function to send messages 210 may not be delivered in any particular delivery order, nor have any particular message identifier order. It is also to be appreciated that messages 210 queued in response to calls of an asynchronous function to send messages 210 may not be delivered in any particular delivery order, nor have any particular message identifier order with respect to messages 210 sent in response to calls of the synchronous function to send messages 210, nor with the other messages 210 queued in response to calls of the asynchronous function to send messages. The fact that messages 210 may be queued in a particular order does not mean that these messages 210 will be delivered in the same order in which they were queued, nor that the message identifiers of these messages 210 will be assigned in the same order in which they were queued. It is also to be appreciated that there may not be a correlation between the delivery order of messages 210 and the assigned message identifiers of those messages 210, except in the case of the messages 210 being sent by uninterrupted, non-overlapped calls to the synchronous function for sending messages 210.

Message Queuing:

As mentioned above, the bridge component 104 can be configured to support a multithreaded asynchronous message 210 communication framework. Thus, an API with a registered asynchronous function for sending messages can allow for deferred communication by queuing a message 210, and subsequently sending the message 210 in a different thread context than a thread context in which the message 210 was queued. This is in contrast to an alternative synchronous function for sending messages 210 that can also be called for sending messages synchronously, without queuing the messages 210. In some examples of synchronous sending, the message can be sent in the thread context in which the message 210 is queued (e.g., the thread context in which a send-message function is invoked).

In the asynchronous, message queuing scenario, it is to be appreciated that message identifiers will not necessarily be assigned at the time a message 210 enters bridge component 104 subsystem, and will instead be reported to the calling endpoint 122 (or bridge component 124 or 130 used by the endpoint 122) later with the "MessageSentCallback," which is the callback introduced with reference to Function (1). Recall that the "MessageSentCallback" is invoked/activated whenever a queued message 210 is sent, times out, or fails to send, and this callback may be received on some other thread context before the asynchronous function returns in the enqueuing thread's context. Furthermore, a unique queued message identifier can be assigned to a queued message 210, the queued message identifier being unique for a given port 208. This queued message identifier can be used to correlate queued messages 210 to their callbacks (e.g., the "MessageSentCallback"), as well as to cancel a queued message(s) 210. An endpoint 122 may pre-allocate such a queued message identifier by calling a function, such as "CsPortGetUniqueQueuedMessageId" in order to ease programming of the inherent race condition in the "MessageSentCallback." This pre-allocation of a queued message identifier allows the endpoint 122 to pre-populate any required correlation data structures in anticipation of callbacks overlapping the enqueue operation.

Buffer Management:

As mentioned above, data 206 can be serialized as serialized data to create a message 210. Such serialized data can include a message buffer having a starting address and a length. In some embodiments, messages 210 carry a payload of an array of bytes. A message buffer, as passed among APIs of the bridge component 104, can begin with extra space for a header, and the contents of the header can be opaque (i.e., unknown) to the sender and receiver of the message 210. The size of such a header may be determined by calling an API. An endpoint 122 (or a bridge component 124 or 130 utilized by the endpoint 122) can allocate a message buffer using the following example pseudo code:

```
std::uint32_t payloadLength = ...;
// Allocate message buffer with space for Header
std::uint32_t HeaderLength = Port->GetHeaderSize( );
std::uint32_t messageLength = HeaderLength + payloadLength;
unsigned char* messageBuffer = new (std::nothrow) unsigned char[messageLength];
unsigned char* payload = messageBuffer + HeaderLength;
// Fill in payload...
// Send message
MESSAGE_ID messageId;
NTSTATUS status = Port->SendMessage(messageBuffer,
    messageLength, timeoutSeconds * 1000, &messageId);
       // Or Port->QueueMessage( ) to receive
```

A maximum size of the message 210 (Header and payload) may be constrained or limited by OS-specific constrains, a priori knowledge of a given pair of endpoints 122 communicating data 206 with each other via the message 210, or other possible constraints. For example, for a particular port 208 (i.e., a particular port identifier), the pair of endpoints 122 utilizing the particular port 208 may agree (e.g., through an out-of-band mechanism) that the maximum message 210 payload size will be 64 bytes, and, therefore, 64-byte buffers can be utilized throughout the API set without encountering errors.

In regards to buffer lifetimes, it is to be appreciated that, when sending a message 210 by calling the synchronous function, the lifetime of the message buffer of the sending endpoint 122 can extend at least until the call of the synchronous function returns, such as when the message 210 is successfully sent, a timeout occurs before the message 210 can be sent, or the message 210 failed to send (e.g., if the port 208 is in the disconnected state during the attempt to send the message 210). In other words, the message buffer of the message 210 can remain valid and unchanged at least until the call of the synchronous function returns with one of the above status indicators. When sending a message 210 by calling the asynchronous function, the lifetime of the message buffer of the sending endpoint 122 can extend at least until a "MessageSentCallback" is called with a queued message identifier corresponding to the message 210 in question. This "MessageSentCallback" can be activated when the message 210 is successfully sent, a timeout occurs before the message 210 can be sent, or the message 210 failed to send (e.g., if the port 208 is in the disconnected state during the attempt to send the message 210).

In some examples, transferring messages 210 between components 122, 128 via bridge component 104 can permit consistently marshalling and addressing messages 210. In alternatives in which, e.g., endpoint 212 has a dedicated channel with a respective endpoint 214, more code is required to handle message passing between pairs of endpoints, thus increasing the code size and memory requirements of the system. In some systems, kernel components are continuously resident in memory, and are not swapped out. Therefore, consolidating common communications code in bridge component 104 can reduce the memory footprint of kernel-level security agent 118 and increase the amount of memory available to run application processes. Using bridge component 104 for all communications between kernel-level security agent 118 and user-level security agent 116 can also reduce the attack surface of kernel-level security agent 118, compared with alternatives using multiple communications channels, e.g., for respective components 122, 128.

Separating user-level bus 120 and kernel-level bus 126 can permit more effectively exploiting user/kernel parallelism. In alternatives in which, e.g., components 122 and 128 are all connected with a common bus shared between the user mode 202 and the kernel mode 204, bus contention reduces the extent to which user-mode and kernel-mode components can operate in parallel. Moreover, a synchronous call by a kernel-level component 128 to a user-level component 122 could block the kernel until the user-level component 122 returned. This could render the computing device 102 non-responsive for the duration of the call, or could increase the risk of deadlock, e.g., if the user-level component 122 called the kernel while processing the synchronous call.

In some examples discussed above, multiple threads are used by at least one of kernel-level bus 126, kernel-level bridge component 130, user-level bridge component 124, or user-level bus 120. In some examples, multiple threads are used in user mode 202, e.g., to improve the latency of marshalling of messages 210. In some examples, the multiple threads can be allocated on startup of the security agent 132 rather than as needed. This can reduce the variation in latency of message delivery time. In some examples, the number of threads can be rounded up from the system's reported hardware-concurrency value (e.g., std::thread::hardware_concurrency( )) to one of a predetermined number of levels to increase the probability that enough threads will be available to handle the flow of incoming messages 210. For example, hardware-concurrency values can be rounded up to the nearest multiple of four (or of another integer n>1).

Ports 208 can be implemented using various techniques or system services. In some examples, a port 208 can be or include a pipe, e.g., an anonymous or named pipe. In some examples, port 208 can be a SOCK_SEQPACKET socket, which supports reliable transport of discrete messages. In some examples, e.g., using WINDOWS, port 208 can be or include a filter-manager communication port, e.g., using the FltSendMessage( ) API in kernel mode 204 and the FilterGetMessage( ) API in user mode 202, or the FilterSendMessage( ) API in user mode 202 and the MessageNotifyCallback callback in kernel mode 204. In some examples, e.g., using LINUX, port 208 can be or include an AF_NETLINK socket, e.g., of the NETLINK_USERSOCK family (netlink (7)); or a file or set of files implemented using the debugfs RAM filesystem.

In some examples, e.g., as discussed herein with reference to "ConnectCallback," at least one callback described herein can be executed in the context of the calling thread or a different thread. Similarly, messages can be delivered in the context of the sending thread or a different thread. In some examples, messages from kernel mode 204 are delivered in a different thread than the sending thread. This can permit the kernel-level sending thread to handle waiting or timeouts more flexibly than if the sending thread handled delivery of the message. For example, the sending thread can wait for delivery, with or without timeout, or proceed without waiting. This can permit maintaining system responsiveness and liveness while still permitting message transmission from kernel mode 204. Moreover, this permits the kernel to continue operating even if a user-level recipient of the message crashes, locks, or otherwise becomes unable to process the message.

In some examples, messages from user mode 202 are delivered in the same thread as the sending thread. In some examples, a user-level sending thread is elevated to the kernel mode 204 to process the message send, then returned to user mode 202. This can reduce the overhead of context switching during message delivery.

In some examples, a port 208 can be implemented using any message-based user-kernel communication mechanism. In some examples, a port 208 provides reliable message delivery from kernel mode 204 to user mode 202, user mode 202 to kernel mode 204, or both. In some examples, a port 208 provides reliable message delivery from user mode 202 to kernel mode 204, but not from kernel mode 204 to user mode 202 (e.g., because user mode 202 may have insufficient RAM or other resources to receive the message). In some examples, port 208, or a bridge component 124, 130, reports failure to send synchronously with the send-message call. In some examples, port 208, or a bridge component 124, 130, provides a best-effort delivery service. In some examples, user-level bridge component 124 or kernel-level bridge component 130 (or both) provide retries; in some examples, at least one bridge component 124, 130 does not provide retries.

In some examples, a port 208, or a bridge component 124, 130, provides in-order delivery of messages; in other examples, the port 208 or bridge component 124, 130 does not provide in-order delivery. In some examples, the port 208 or bridge component 124, 130 enforces a maximum number of messages in transit through a port 208 at once; in other examples, the maximum number of concurrent messages is limited only by the OS 114, or by available system resources.

As noted above, messages can be transmitted across a port 208 synchronously or asynchronously. Either bridge component 124, 130 can implement message transmission using either synchronous or asynchronous sending functions. Since the bridge components 124, 130 are not directly visible to components 122, 128, in some examples, this port-level synchronicity is also hidden.

In some examples, each bus 120, 126 can provide a synchronous or asynchronous inter-bus transmission service to components 122, 128. In some examples of synchronous sending, the sending component 122, 128 is notified immediately if the transmission failed. In some examples of asynchronous sending, the sending component 122, 128 is not notified immediately if the transmission failed, e.g., is notified asynchronously, or is not notified at all. In some examples, the routing logic in the appropriate bus 120, 126 determines whether messages from particular components 122, 128 will be sent synchronously or asynchronously. In some examples, at least one of bridge components 124, 130 is configured to notify a sending component 122, 128 if transmission of a message failed.

In some examples, multiple threads are used to implement at least one bus 120, 126, so that messages can be transferred asynchronously across that bus 120, 126 between a component 122, 128 and the corresponding bridge component 124, 130. In some of these examples, bridge components 124, 130 use the synchronous SendMessage( ) function of port 208 to transfer messages synchronously between themselves. In other examples in which messages can be transferred asynchronously across a bus 120, 126 between a component 122, 128 and the corresponding bridge component 124, 130, bridge components 124, 130 can additionally or alternatively use the asynchronous QueueMessage( ) function of port 208 to transfer messages asynchronously between themselves.

Figure 3:
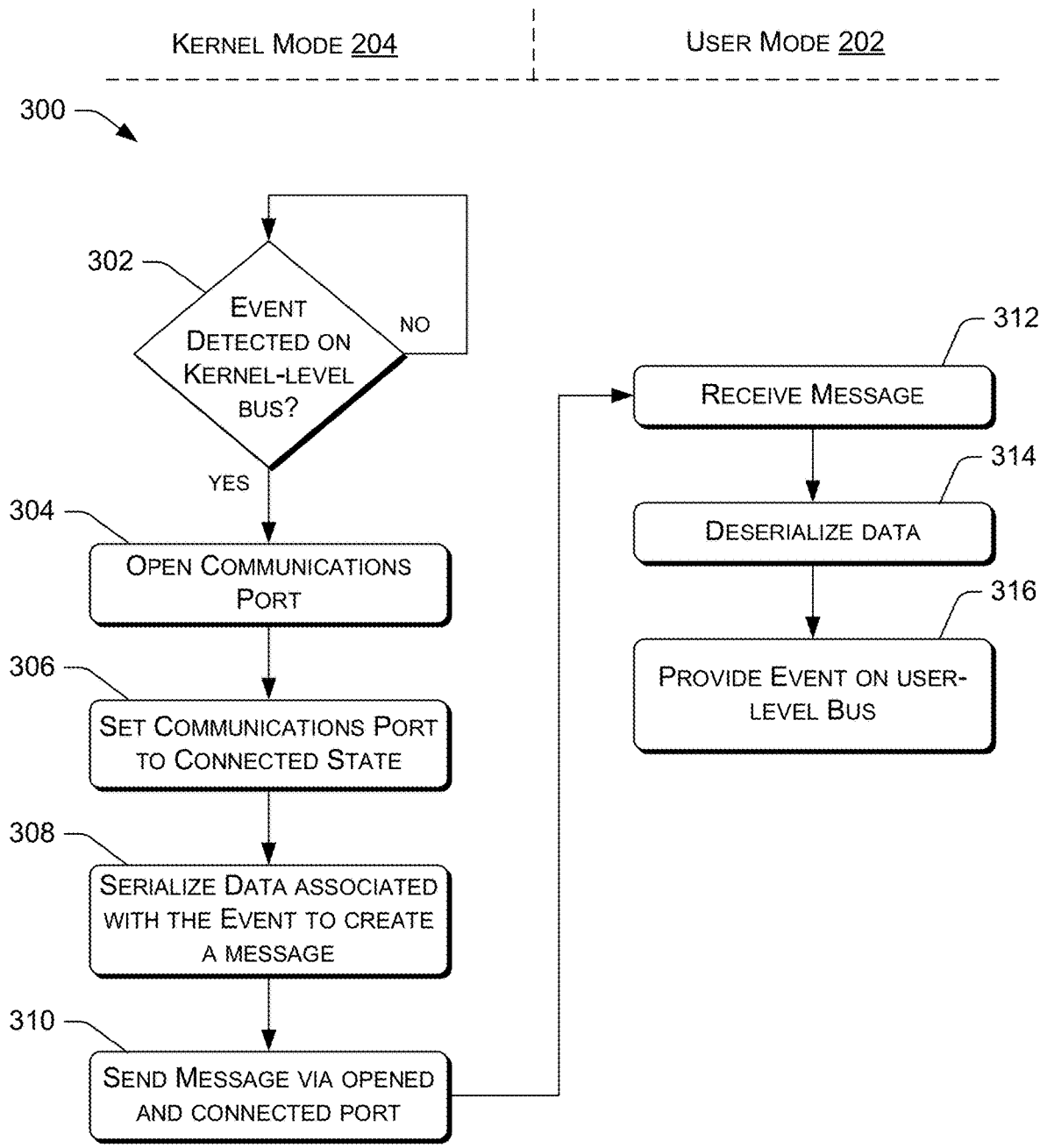
FIG. 3 illustrates an example technique for sending data between a kernel-level component and a user-level component in a direction from the kernel mode to the user mode.

FIG. 3 illustrates example technique 300 for sending data 206 between a kernel-level component 128 and a user-level component 122 in a direction from the kernel mode 204 to the user mode 202.

Example functions shown in FIG. 3, and in other flow diagrams and example techniques herein, such as FIGS. 4-13, can be implemented on or otherwise embodied in hardware, software, or a combination thereof. For example, the techniques can be implemented on one or more computing device(s) 102, e.g., using software running on such device(s), e.g., software executed by processor(s) 106, FIG. 1. For the sake of illustration, the example technique 300 is described below with reference to components, data items, or operations discussed with reference to FIGS. 1 and 2 that can carry out, participate in, or be processed by the steps of the example technique 300. However, technique 300, and example method(s) or technique(s) shown in FIGS. 4-13, also can be, but are not limited to being, carried out by any specifically-identified components.

The order in which the operations are described in each example flow diagram or technique is not intended to be construed as a limitation, and any number of the described operations can be combined in any order or in parallel to implement each technique. In each flow diagram, fewer than all of the depicted operations can be performed, except as expressly noted. For example, only one of the depicted operations can be performed. Moreover, the operations in each of FIGS. 3-13 can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. In the context of hardware, the operations represent logic functions implemented in circuitry, e.g., datapath-control and finite-state-machine sequencing functions. Therefore, descriptions of operations below also describe such software or hardware structures to carry out the described functions.

At 302, the kernel-level bridge component 130 may detect an event (or data 206 associated with the event) on the kernel-level bus 126 of the kernel-level security agent 118 by virtue of the kernel-level bridge component 130 being attached to the kernel-level bus 126. The data 206 associated with the event may have originated from a kernel-level component 128, such as the component 212. In some embodiment, the determination at 302 may involve a determination of whether the event is to be sent to a user-level component 122, such as when the event satisfies one or more criteria. Alternatively, the data 206 originating from the component 212 can indicate to the kernel-level bridge component 130 that the data 206 is to be sent to a user-level component 122. In some cases, the data 206 associated with the event may further indicate a port identifier that is predetermined for communicating data 206 to a particular user-level component 122.

Unless and until an event is detected at 302 that is to be sent to a user-level component 122, the technique 300 follows the "no" route from 302 and waits or iterates until an event is detected. Upon detecting an event at 302, the technique 300 follows the "yes" route from 302 to block 304, if a port 208 is not yet open, or to block 308, if a port 208 is already open.

At 304, a communications port 208 is opened, as described herein. The port 208 can be used as a communication medium for sending data 206 associated with the event to a user-level endpoint component 122. At this point, because data 206 is to be communicated between a kernel-level component 128 and a user level component 122, the kernel-level component 128 from which the data 206 originated can be regarded as a first endpoint component 122, and the destination (or target) user-level component 122 that is to receive the data 206 can be regarded as a second endpoint component 122.

At 306, the communications port 208 can be set to a connected state. At 308, the data 206 can be serialized as serialized data to create a message 210, such as by translating the data 206 into a format that can be transmitted over the communications port 208. In some embodiments, the serialized data can include a message buffer having a starting address and a length, as described herein. In some examples, blocks 304 and 306 can be performed prior to the detection (or receipt) of an event(s) at 302. In this scenario, an event may be detected after a communications port 208 is opened and set to a connected state.

At 310, a message 210 can be sent via the opened and connected communications port 208. As mentioned above, and as described in more detail below, the sending of the message 210 at block 310 can be accomplished by activating at least one of a synchronous function or an asynchronous function. In the asynchronous case, the message 210 may be initially queued in a first thread context, and sent at block 310 in a second, different thread context.

At 312, the message 210 (having been sent via the communications port 208 of the bridge component 104) is received by a component 122 in the user mode 202. The receiving component 122 can be the user-level bridge component 124 and/or the receiving user-level endpoint component 122, such as the endpoint 214 of FIG. 2.

Receiving the message 210 at block 312 can include calling a function by the user-level bridge component 124 (or by the corresponding receiving endpoint 214), such as the following example Function (4), suitable for receiving incoming messages 210:

---
Function (4)
---
NTSTATUS
CsPortReceiveMessage (
  _in CS_PORT Port,
  _in_opt ULONG Timeout,
  _out P_RECEIVED_MESSAGE Message,
  _out PCS_MESSAGE_ID MessageId
);
---

In Function (4), "Port" is the port handle returned for Function (1) for the given port 208 over which the message 210 was sent; "Timeout" is a parameter that specifies how long the calling component 122 of Function (4) is willing to wait for an incoming message 210, measured in any suitable unit of time (e.g., milliseconds), where a timeout value of 0 can be considered valid and implies that the receive operation immediately returns "STATUS_TIMEOUT" if it turns out that the other endpoint 128 is not sending a message 210 at the moment; "Message" retrieves the context structure representing the received message 210; "MessageID" is populated with the message identifier of the received message 210. This unique message identifier would have been assigned by the sending endpoint's 128 call of the synchronous function or the asynchronous function for sending messages 210, and the message identifier can be used to match message contexts and request/reply semantics.

The call of Function (4), above, can return with multiple possible return codes including, without limitation, a "STATUS_SUCCESS" return code, a "STATUS_TIMEOUT" return code, or a "STATUS_CONNECTION_DISCONNECTED" return code. The "STATUS_SUCCESS" return code for Function (4) indicates that the message 210 was successfully received from the other endpoint 128 and copied to the provided message buffer. The "STATUS_TIMEOUT" return code for Function (4) indicates that the attempt to receive a message 210 timed out. The "STATUS_CONNECTION_DISCONNECTED" return code indicates that the port 208 was closed before the bridge component 124 was able to receive a message 210 from the opposite endpoint 212.

When receiving a message at block 312 by calling Function (4), the port 208 can provide a buffer pointer to the calling component (e.g., the bridge component 124, or the corresponding endpoint 122) by filling out the relevant fields in a particular received message data structure, such as the following example received message data structure:

---
typedef struct _RECEIVED_MESSAGE
{
  ULONG Version;
  ULONG Length;
  PVOID Buffer;
} RECEIVED_MESSAGE, *P_RECEIVED_MESSAGE;
---

The calling component may be configured to free the message buffer (or message context) at when the receiving endpoint 122 has received a Function (4) return code. This can be done as soon as possible to allow uninterrupted flow of incoming messages 210. When an incoming message 210 is received by calling Function (4), and a return code of Function (4) is received, the endpoint 122 can free the message context by calling the following example Function (5):

---
Function (5)
---
void
CsPortFreeReceivedMessage(
  _in CS_PORT Port,
  _in P_RECEIVED_MESSAGE Message
);
---

In Function (5), "Port" is the port handle returned by Function (1) for the port 208 over which the message 210 was received; and "Message" is the received message 210 from a previous call of Function (4). A call to Function (5) transfers ownership of the message 210 back to the bridge component 104. The endpoint 122 may be prevented from accessing any fields or memory of the message 210 after making this call to Function (5).

With continuing reference to the technique 300, at block 314, the serialized data of the message 210 (e.g., the message buffer) can be deserialized to "unpack" the data 206 for consumption by the receiving endpoint component 214.

At 316, the data 206 associated with the event can be provided on the user-level bus 120 for consumption or reception by the receiving endpoint 214 that is attached to the user-level bus 120.

Figure 4:
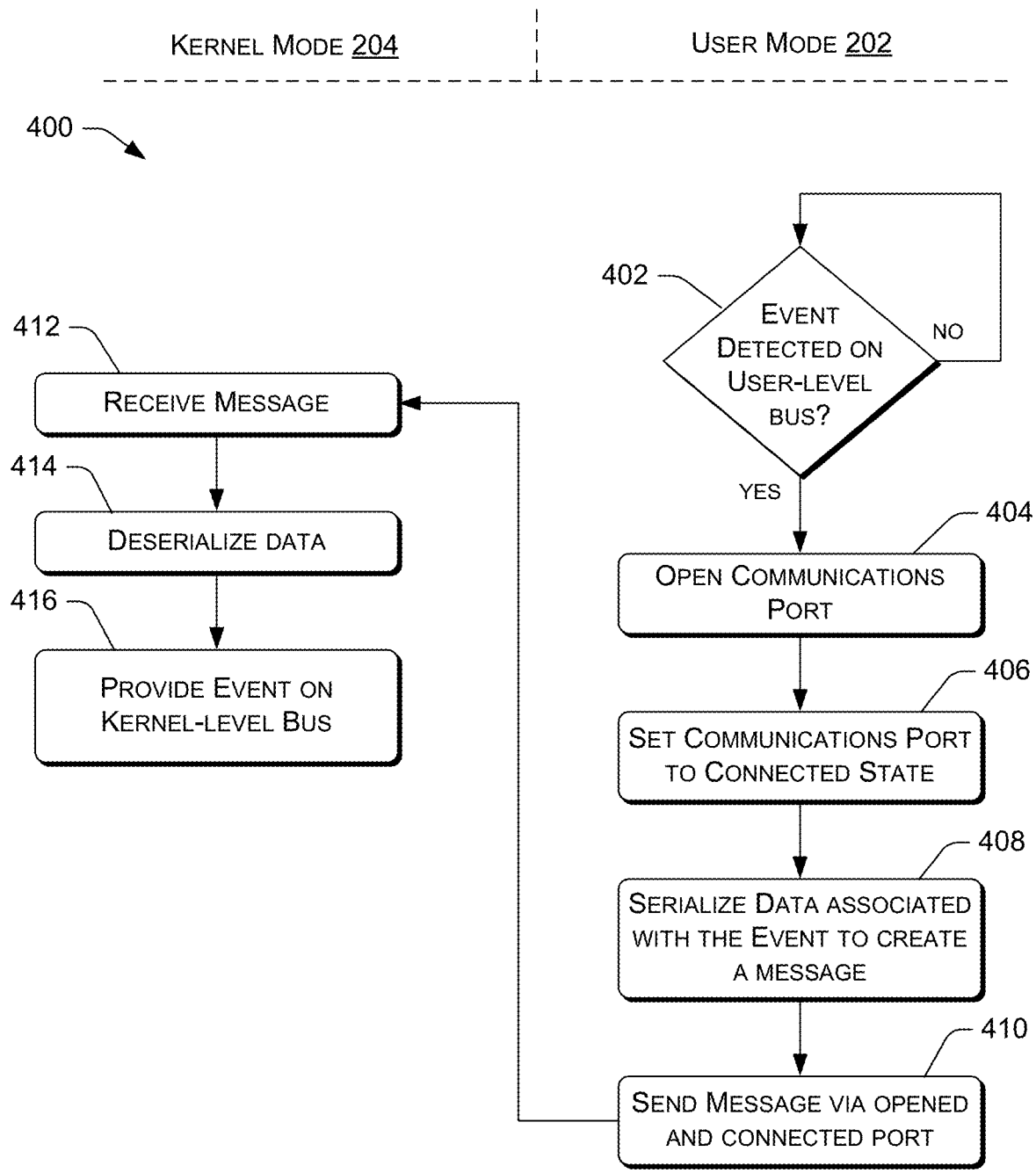
FIG. 4 illustrates an example technique for sending data between a kernel-level component and a user-level component in a direction from the user mode to the kernel mode.

FIG. 4 illustrates example technique 400 for sending data 206 between a kernel-level component 128 and a user-level component 122 in a direction from the user mode 202 to the kernel mode 204. FIG. 4 is shown to illustrate the symmetric characteristic of the interface exposed by the bridge component 104 in that the operations of FIG. 4 can be similar to the operations of FIG. 3, except that the direction of data 206 flow is in the opposite direction; from user mode 202 to kernel mode 204. Thus, illustrated blocks 402, 404, 406, 408, 410, 412, 414, and 416 can be carried out in a similar fashion to that described with the respective blocks 302-316 of the technique 300, recognizing that components involved are reversed from the perspective of the user mode-kernel mode demarcation. Therefore, the operations shown in FIG. 4 will not be described in more detail for the sake of brevity, as details of carrying out the operations described herein with reference to blocks 402-416 can be understood by referring to the similar operations 302-316 and reversing the components from the perspective of the user mode-kernel mode demarcation.

Further Illustrative Examples

Figure 5:
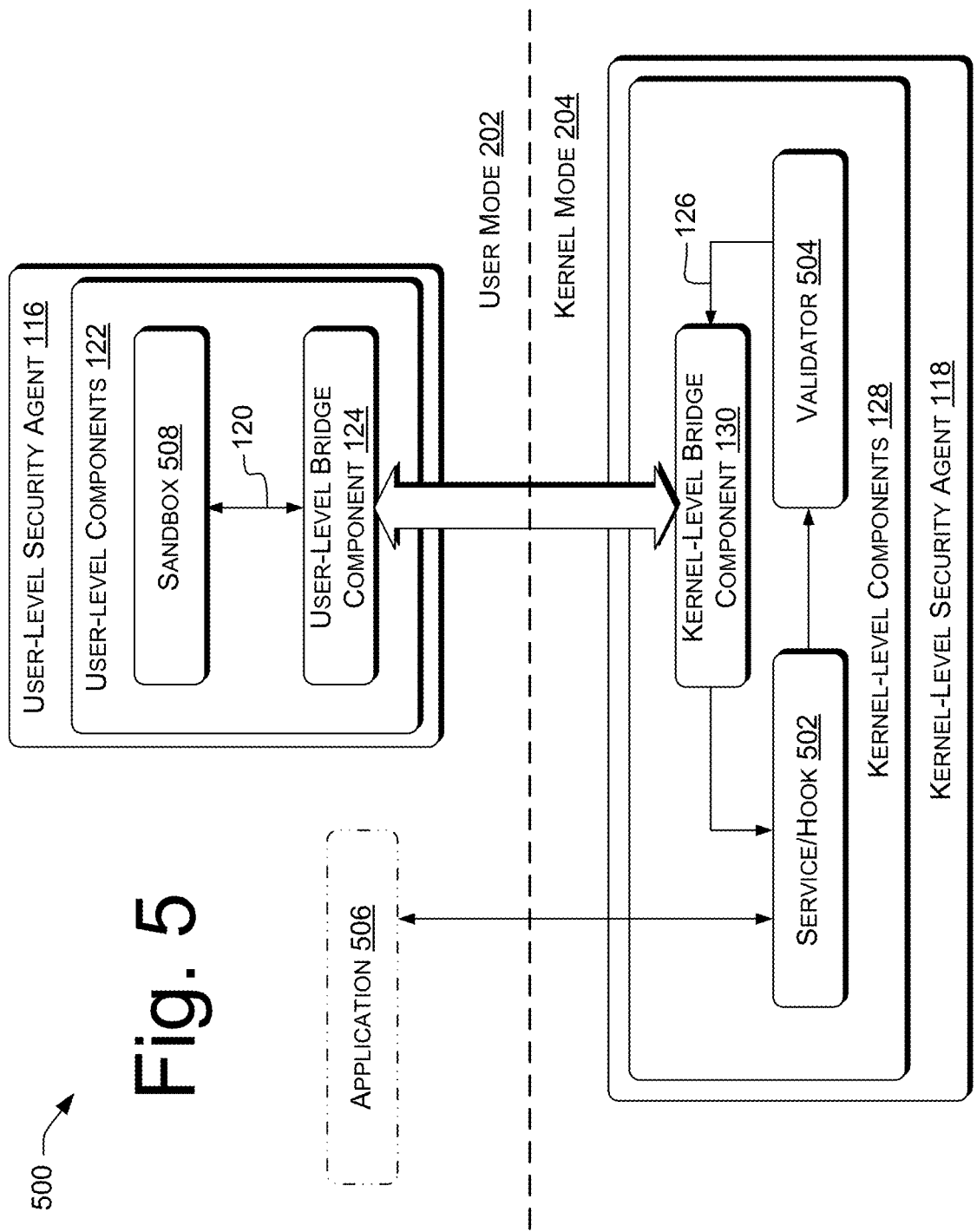
FIG. 5 illustrates example components of a computing device configured for detecting malicious activity.

FIG. 5 shows an example architecture 500 of software components according to various examples. The directions of arrows shown on the diagram illustrate one example. In some examples, data can flow bidirectionally along any arrow shown in FIG. 5. Kernel-level security agent 118 includes components 128 such as a service/hook module 502 and a validator module 504. Modules 502 and 504 can be implemented together or separately. Service/hook module 502 represents a module that receives notification of an event pertaining to, or that performs a service on behalf of, an application 506 running in user mode 202. In some examples, service/hook module 502 can be provided by OS 114, and validator module 504 can register with service/hook module 502 to receive notifications of events.

Figure 6:
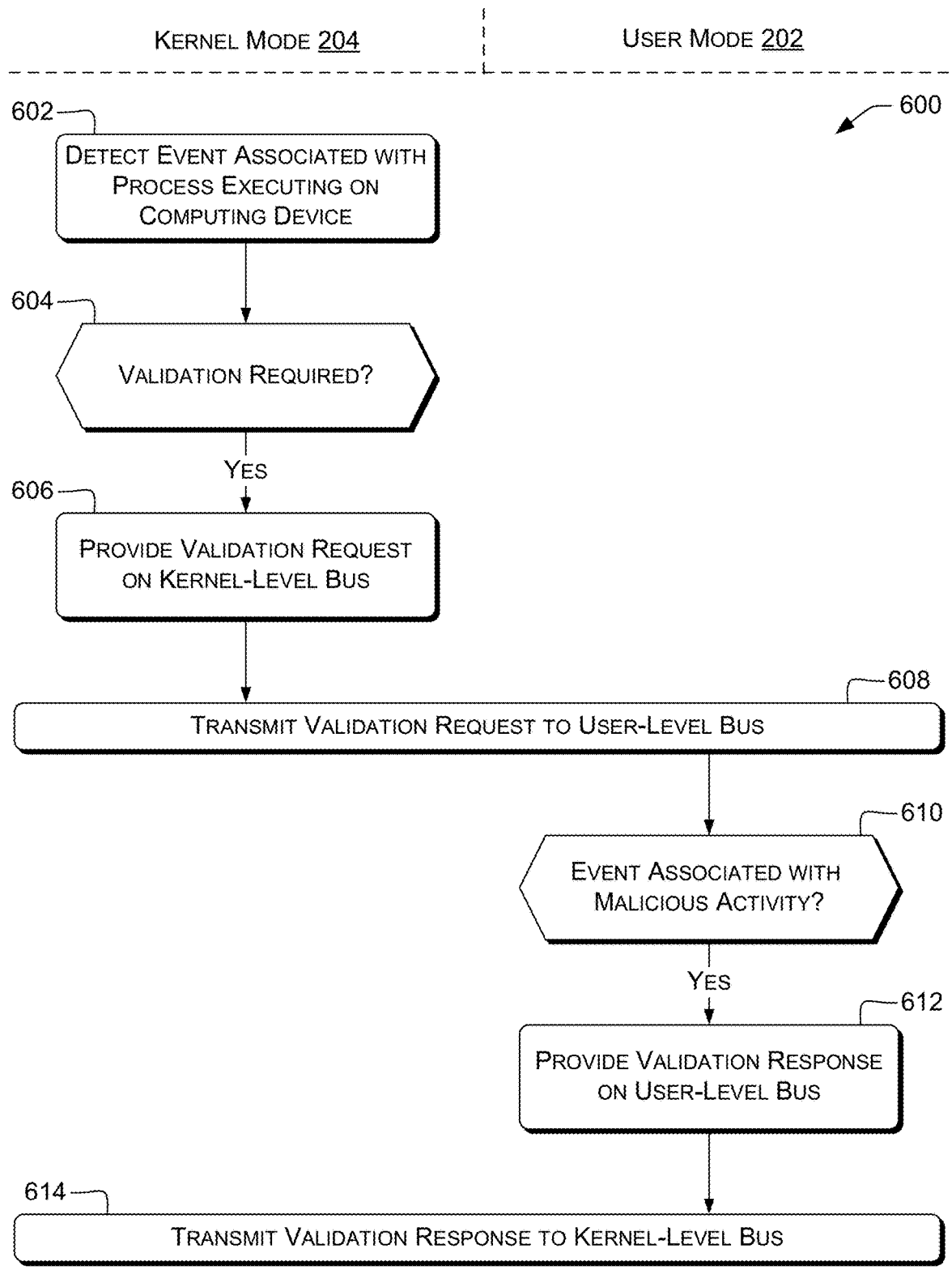
FIG. 6 illustrates an example technique for detecting malicious activity on a computing device.
Figure 7:
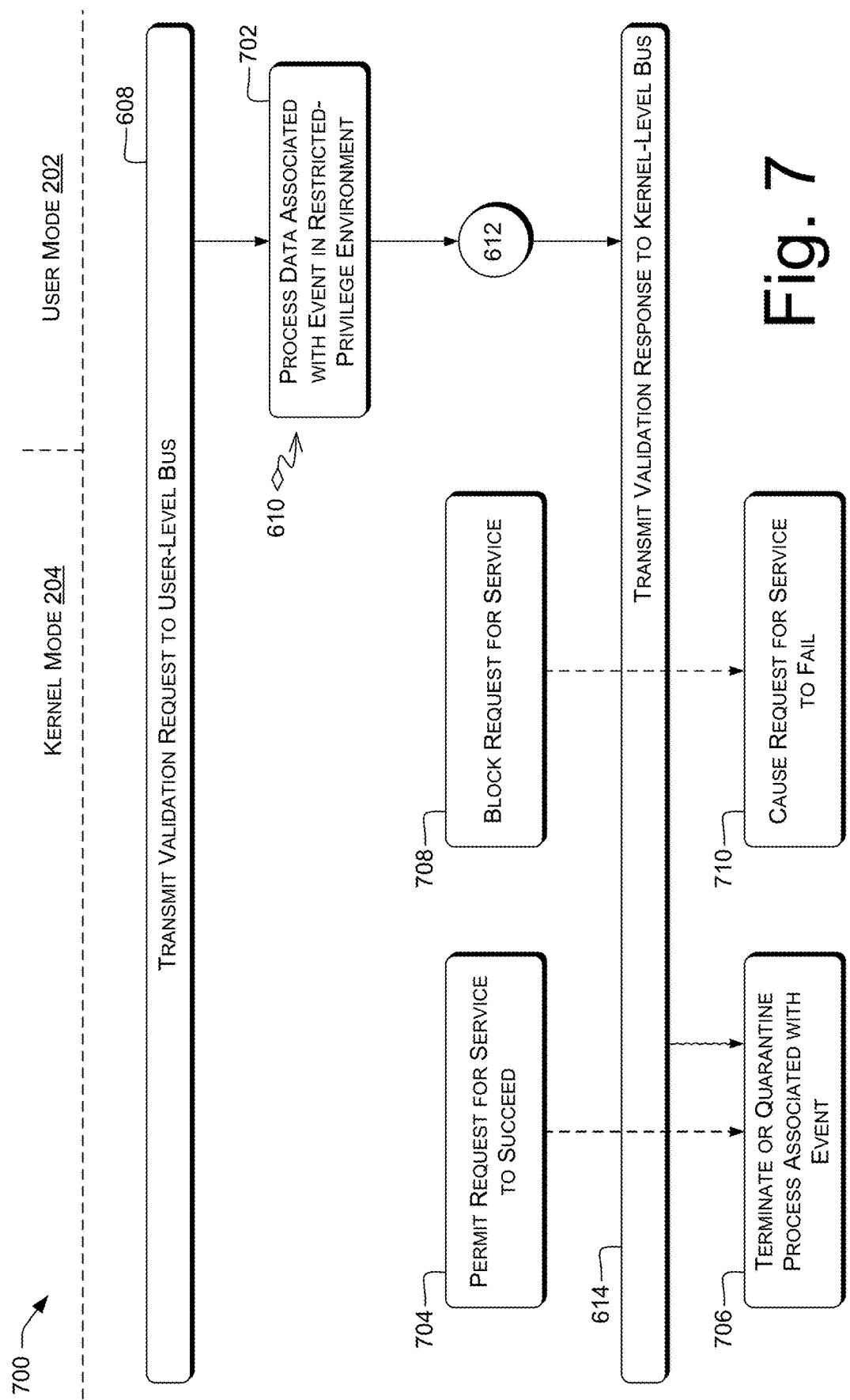
FIG. 7 illustrates example techniques for detecting or responding to malicious activity.
Figure 8:
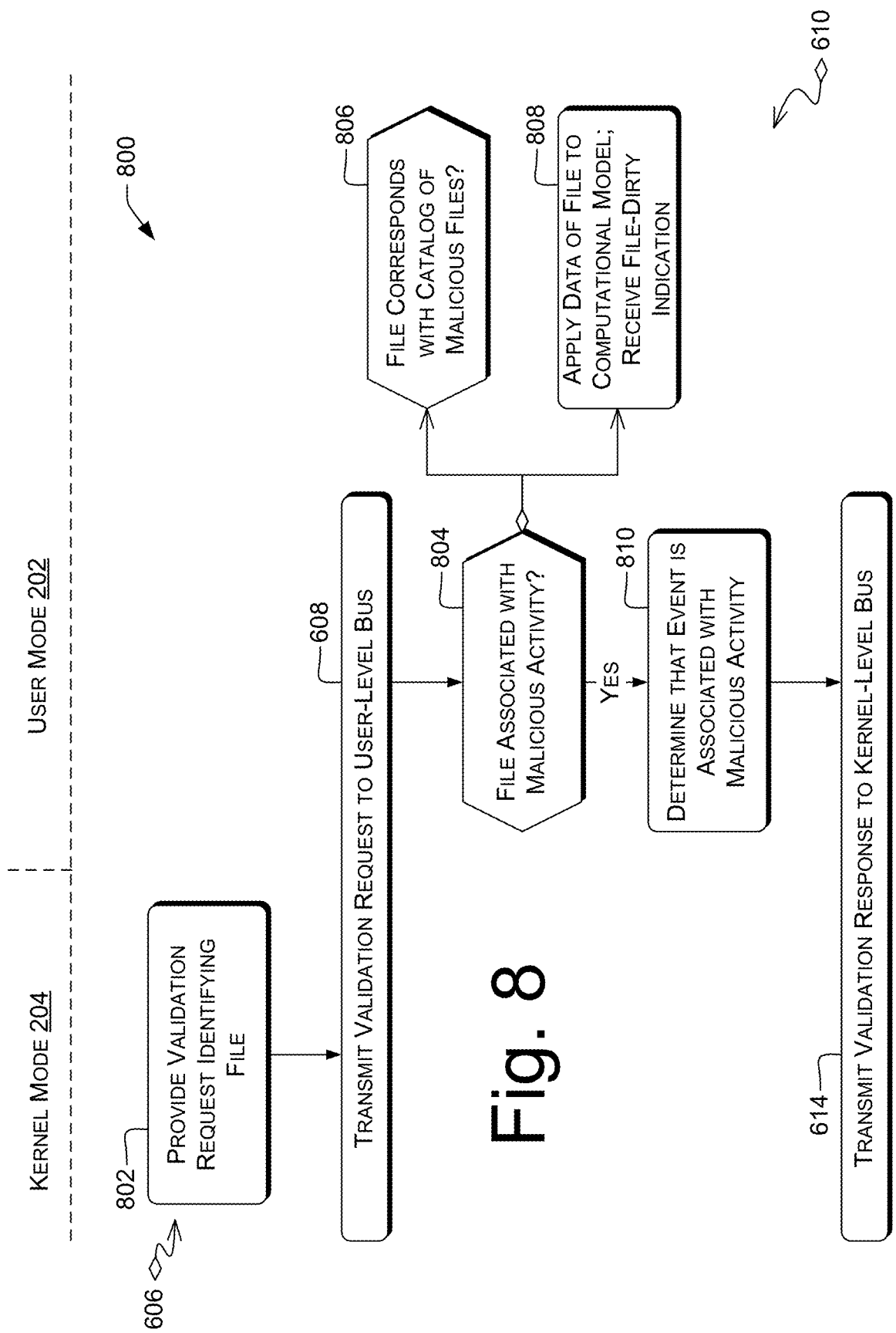
FIG. 8 illustrates an example technique for detecting malicious activity related to a file.

In some examples, e.g., as discussed herein with reference to FIGS. 6-8, Service/hook module 502 can provide data 206 associated with the event to validator module 504. Validator module 504 can, in turn, send a message 210 on the kernel-level bus 126. That message 210 can be routed to kernel-level bridge component 130, which can send the message 210 to the user-level bridge component 124. The user-level bridge component 124 can forward data 206 via the user-level bus 120 to a "sandbox" 508, i.e., a restricted-privilege execution environment. Code in sandbox 508 can analyze the data 206 to determine whether the event is associated with malicious activity. The code in sandbox 508 can then respond to the validator module 504 via user-level bus 120, user-level bridge component 124, kernel-level bridge component 130, and kernel-level bus 126. In some examples (e.g., as shown), the response is transmitted directly to service/hook module 502. In some examples, the response is transmitted to validator module 504, which in turn communicates with service/hook module 502. Service/hook module 502 then determines whether or not to permit action by the application 506 with respect to the initial call or event. Service/hook module 502 can additionally or alternatively remediate malware or mitigate its effects, e.g., by terminating or quarantining processes or files.

FIG. 6 is a dataflow diagram that illustrates an example technique 600 for detecting malicious activity on a computing device, and related data items. Operations of technique 600 can be performed by at least one computing device 102, 110, e.g., using architecture 500. In some examples, operations in user mode 202 are used to support malicious-activity detection in the kernel mode 204.

In some examples, at block 602, processor 106 can detect, in a kernel mode of the computing device, an event associated with a process executing on the computing device 102. Examples of events are described herein with reference to FIG. 1. Block 602 can include providing data 206 associated with the event.

In some examples, at block 604, processor 106 can determine, in the kernel mode, that validation of the event is required. In some examples, processor 106 validates all events of specific types, e.g., attempts to create processes or threads, attempts to write to system files, attempts to access system memory, or any file access. Block 604 can include comparing a type or other fields of the data 206 with stored criteria in memory 112 to determine that validation is required. In some examples, processor 106 determines that validation is required if the event is semantically interesting, as discussed herein with reference to FIG. 1. In some examples, block 604 is omitted, and block 602 is followed directly by block 606, below.

In some examples, at block 606, processor 106 can provide a validation request on the kernel-level bus 126. Block 606 can be performed in response to the determination at block 604.

In some examples, at block 608, processor 106 can transmit the validation request to a user-level bus 120 via bridge component 104. Examples are discussed herein, e.g., with reference to FIGS. 2 and 3.

In some examples, at block 610, processor 106 can determine, in a user mode of the computing device, in response to the validation request on the user-level bus, that the event is associated with malicious activity. Examples are discussed herein, e.g., with reference to FIGS. 7 and 8. For example, processor 106 can access data sources or APIs that are not available in kernel mode, or that are not readily accessible in kernel mode. For example, processor 106 can access user-level secure-communications APIs (e.g., HTTPS) while in user mode 202.

In some examples, processor 106 can intercept or monitor a service (e.g., Remote Procedure Call, RPC) in the user mode 202. Block 610 can include determining whether the event is associated with malicious activity further based at least in part on monitored data of the service.

In some examples, block 610 can include applying data 206 to a machine-learning model, e.g., a neural network, to distinguish malicious events from benign events. In some examples, block 610 can include training a machine-learning model using data 206. Examples are discussed herein, e.g., with reference to Table 1. In some examples, block 610 can retrieve a trained computational model from memory 112 or other storage, and operate the computational model on data 206 to provide output(s) indicating whether or not data 206 indicate that the event is associated with malicious activity.

In some examples, at block 612, processor 106 can provide a validation response on the user-level bus in response to the determination that the event is associated with malicious activity. The validation response can additionally or alternatively be provided unconditionally, and can include a flag or other value indicating the whether the event is associated with malicious activity.

In some examples, at block 614, processor 106 can transmit, via the bridge component, the validation response to the kernel-level bus. Examples are discussed herein, e.g., with reference to FIGS. 2 and 4.

In some examples, using bridge component 104 and blocks 608 and 614 can permit transmitting various types of validation requests and responses between user mode 202 and kernel mode 204 without requiring custom marshalling code for each type. This can reduce the attack surface of security agent 132. In some examples, updates to security agent 132 can add detection of new types of events, or exchange of data 206 associated with those events via bridge component 104.

FIG. 7 is a dataflow diagram that illustrates an example technique 700 for detecting malicious activity, and related data items. Operations of technique 700 can be performed by at least one computing device 102, 110, e.g., using architecture 500. In some examples, block 608 can be followed by block 702, which can be followed by block 612. In some examples, block 610 can include block 702. In some examples, block 614 can be preceded by blocks 704 or 708, or followed by blocks 706 or 710.

In some examples, at block 702, processor 106 can process at least some data 206 associated with the event in a restricted-privilege execution environment ("sandbox") in the user mode 202. Examples of sandboxes can include environments with the credentials of a nonprivileged user, with reduced privileges compared to a logged-in user, or with limitations on filesystem access such as a chroot jail. In some examples, the sandbox can have restricted access to network or other communication channels.

In some examples, data 206 includes the contents of an executable file (e.g., a Portable Executable, PE) to be run, or of another type of file. Processor 106 can parse the file contents in a sandbox. In this way, a malicious file designed to exploit a weakness in a parsing routine or other analysis program will not be able to do damage beyond the sandbox. For example, the sandbox can be limited by resource-utilization quotas to prevent denial-of-service (DOS) attacks on the analysis program from rendering the computing device 102 unusable. Quotas can be placed on, e.g., RAM usage, disk usage, or CPU usage. In other examples, network restrictions can prevent exploited analysis programs from communicating with command-and-control servers, e.g., of botnets, or with data repositories, such as servers that store the keys needed to decrypt files that have been encrypted by ransomware.

In some examples, data 206 includes contents or metadata of a file, and block 702 includes extracting features of those contents or metadata. For example, processor 106 can provide at least some of the data 206 as input to a neural network, decision tree, or other learned or trained computational model that outputs feature values. Additionally or alternatively, processor 106 can perform predetermined extraction or feature-determination algorithms with respect to at least some of the data 206, e.g., subsetting or pefile analysis. Examples of feature values and algorithms that can be used to generate them are shown in Table 1. For brevity, the symbol "Σ" in Table 1 refers to the data 206 or portion(s) thereof as may be determined or processed in the sandbox. Additionally or alternatively, feature extraction can be performed outside a sandbox.

TABLE 1

| Feature |
| --- |
| Entropy of Σ |
| Entropy of a segment or other portion(s) of Σ, e.g., a TEXT or DATA segment |
| Entropy of a subset of Σ, e.g., of multiple sections |

TABLE 1-continued

| Feature |
| --- |
| Character(s) or symbol(s), or hash(es) or other representation(s), of human-readable text ("printable strings") included in Σ |
| Number of printable strings in Σ |
| Flags or other values of standardized headers in Σ, e.g., the MZ or PE headers or the DLL import table of a WINDOWS executable file |
| Flags or other values of other headers or structures in Σ, e.g., comp.id values found in the Rich header in a WINDOWS executable file |
| Contents of Σ, e.g., ten (or another number of) bytes at the entry point or the beginning of main( ) in an executable file |
| Output(s) of a trained autoencoder when provided Σ as input, e.g., when provided bytes at the entry point |
| Size of Σ (e.g., in bytes) |
| SHA-256 or other cryptographic hash value(s) of at least portion(s) of Σ, e.g., of headers, individual sections, metadata, version information, or icons, text, fonts, audio, graphics, or other content assets embedded or included in Σ. |
| File type of Σ, e.g., as output by pefile, PEiD, TrID, or file(1) |
| Other output(s) of a computational model. For example: A Boolean or other two-valued output indicating whether the computational model considers Σ to be associate with malware Numerical values indicating strengths of association between Σ and various types of malware, as determined by the computational model |

In some examples, machine-learning techniques are applied to a corpus or knowledge base including samples of clean data streams and dirty data streams (e.g., executable files, DLLs or other libraries, device drivers, macro-enabled documents, Web pages, or other documents). Examples of machine-learning techniques can include gradient descent, AdaGrad, xgboost, or other supervised or unsupervised learning techniques. The machine-learning techniques can be used to produce a computational model based on that corpus or knowledge base. Processor 106 can apply Σ as input to the computational model, and receive as output a classification of Σ, or the data stream containing Σ, as likely malicious or likely not malicious (or as a member of one of various confidence intervals, such as high confidence, medium confidence, low confidence, or likely not malicious). Using learned computational models can permit analyzing data streams not found in a catalog In some examples of blocks 704-710, the kernel can take various actions with respect to the event while awaiting the validation response from the user mode 202. Any of blocks 704-710 can be performed after block 608. Blocks 704 and 708 can additionally or alternatively be performed before, or in parallel with, block 608. In some of these examples, the event is associated with a request for service. Requests for service can include, e.g., requests to open files, spawn processes, or open network communication channels.

In some examples, at block 704, processor 106 can, in the kernel mode, permit the request for service to succeed before receiving the validation response on the kernel-level bus. In some examples, block 704 permits the request for service to succeed while the event is being processed in the user mode. For example, the event can be associated with a system call from a process. Rather than blocking the process, the kernel can permit the call to return pending validation. This can improve system responsiveness.

In some examples, at block 706, processor 106 can, in the kernel mode, terminate or quarantine a process in response to the validation response on the kernel-level bus. For example, if the user level determines that the event is associated with a malicious process, block 706 can terminate the malicious process to reduce its opportunity to damage the system, as discussed below. For example, block 706 can terminate or quarantine the process that made the system call associated with the event.

In some examples, block 706 is used without block 704, as represented by the wavy arrow. Block 614 can provide a validation response corresponding with an event associated with a process. Block 706 can terminate or quarantine that process. This can improve system security even in situations in which the request was blocked, as discussed below. In some examples, the event is associated with a request to create a second process. Block 706 can include terminating or quarantining the process that made the request, the second process, or both.

In some examples, at block 708, processor 106 can, in the kernel mode, block the request for service to await validation. For example, the kernel can put the process that made the request for service to sleep before or after transmitting the validation request at block 606 or 608.

In some examples, at block 710, processor 106 can cause the request to fail in response to the validation response on the kernel-level bus 126. For example, the validation response can indicate that the request is associated with malicious activity, e.g., launching a malicious executable. Rather than performing the requested service, processor 106 can inform the caller that the request has failed.

In some examples, block 706 can be used instead of or in addition to block 710. For example, after the request for service is blocked at block 708, processor 106 can await the validation response on the kernel-level bus 126. In response to an indication that the requesting process is malicious, processor 106 can terminate or quarantine that process (block 706).

FIG. 8 is a dataflow diagram that illustrates an example technique 800 for detecting malicious activity, and related data items. Operations of technique 800 can be performed by at least one computing device 102, 110, e.g., using architecture 500. In some examples, block 606 can include block 802, or block 610 can include blocks 804, 806, 808, or 810.

In some examples, at block 802, processor 106 can provide, in the kernel mode 204, the validation request identifying a file to which access is requested. The file can be referenced, e.g., by data 206 of the event. The event can be, e.g., a normal open( ) of a file, or a request to access the file accompanied by a privilege or elevation request.

In some examples, at block 804, processor 106 can determine, in the user mode, that the file is associated with malicious activity. For example, processor 106 can determine that the file was created by a malicious (or not known-good) executable, or that the file is itself malware or another malicious file. Block 804 can include block 702 of sandboxed testing of the contents of the file. In some examples, block 804 can include block 806, or block 808, or both block 806 and block 808.

In some examples, at block 806, processor 106 can determine that the file corresponds with a catalog of malicious files, e.g., of malicious executable files. For example, processor 106 can compute a hash (e.g., SHA-256) of the contents of the file identified in the validation request, and look up that hash in the catalog. Additionally or alternatively, processor 106 can run PEID, TrID, or another file-content analyzer. The analyzer can include the catalog, and thereby provide an indication of maliciousness directly. Additionally or alternatively, processor 106 can look up results of the analysis in the catalog.

In some examples, at block 808, processor 106 can apply at least some data of the file to a machine-learning model, and receive from the machine-learning model an indication ("file-dirty indication") that the at least some data is associated with malicious activity. Examples are discussed herein, e.g., with reference to Table 1 or block 610.

In some examples, at block 810, processor 106 can determine that the event is associated with malicious activity. Block 810 can be performed in response to the determination at block 804 (e.g., via block 806 or block 808) that the file is associated with malicious activity. This can reduce the false-detection rate by using data of files to evaluate events referring to those files.

Figure 9:
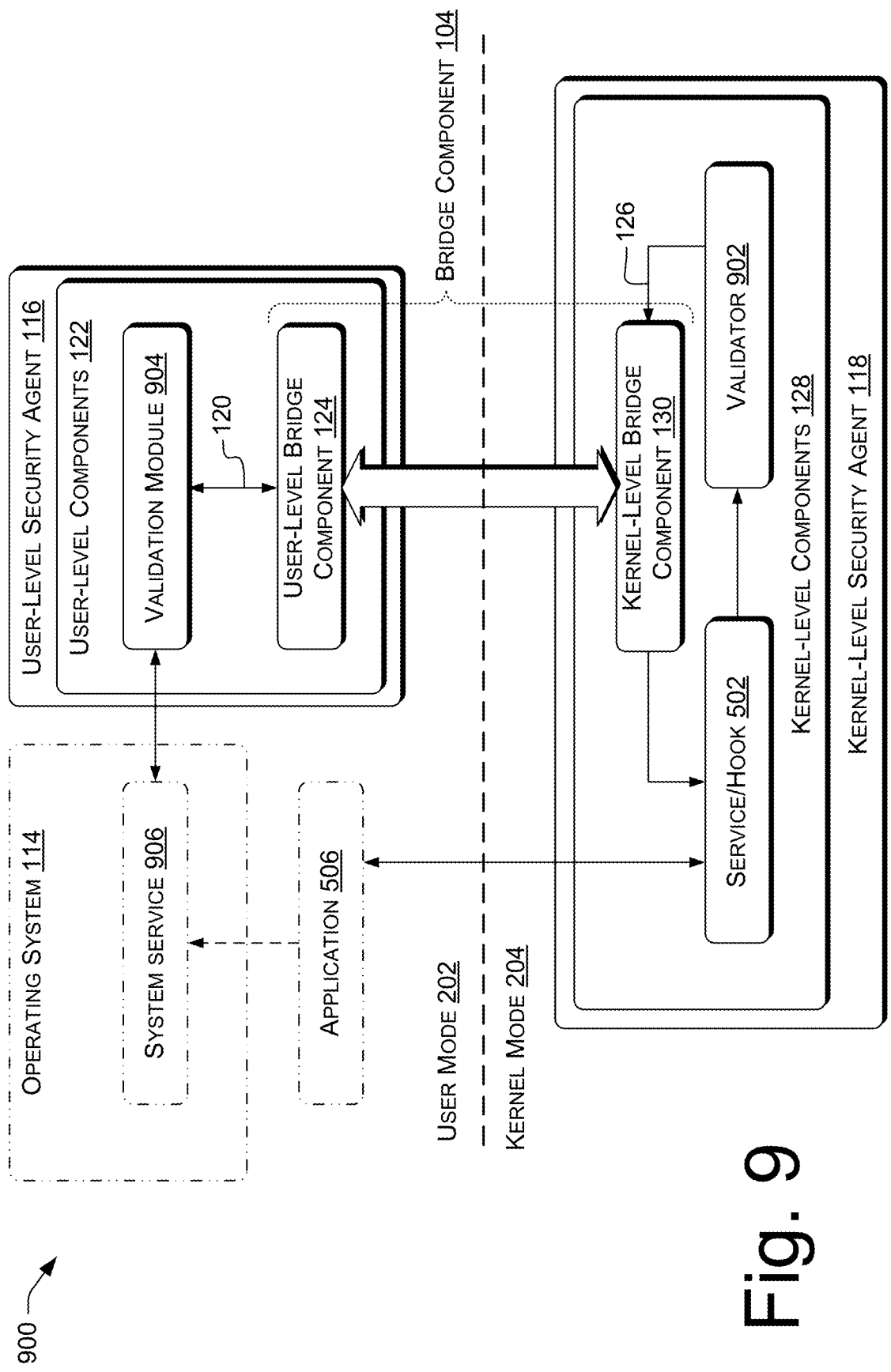
FIG. 9 illustrates example components of a computing device configured for detecting malicious activity or processing security queries.

FIG. 9 shows an example architecture 900 of software components according to various examples. The directions of arrows shown on the diagram illustrate one example. In some examples, data can flow bidirectionally along any arrow shown in FIG. 9. Kernel-level security agent 118 includes components 128 such as a validator module 902. Service/hook module 502 can be as shown in FIG. 5.

Figure 10:
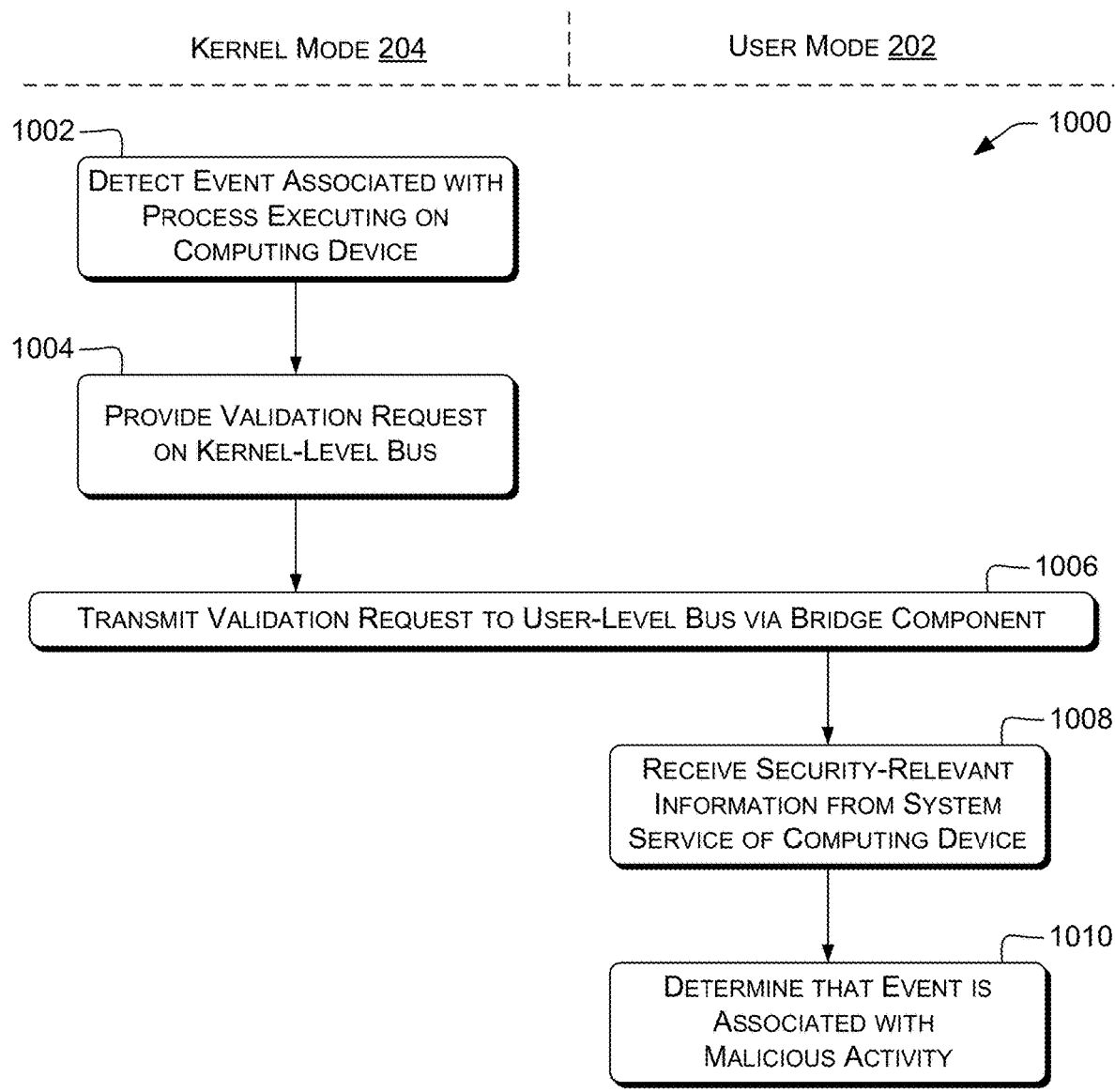
FIG. 10 illustrates an example technique for detecting malicious activity on a computing device.
Figure 11:
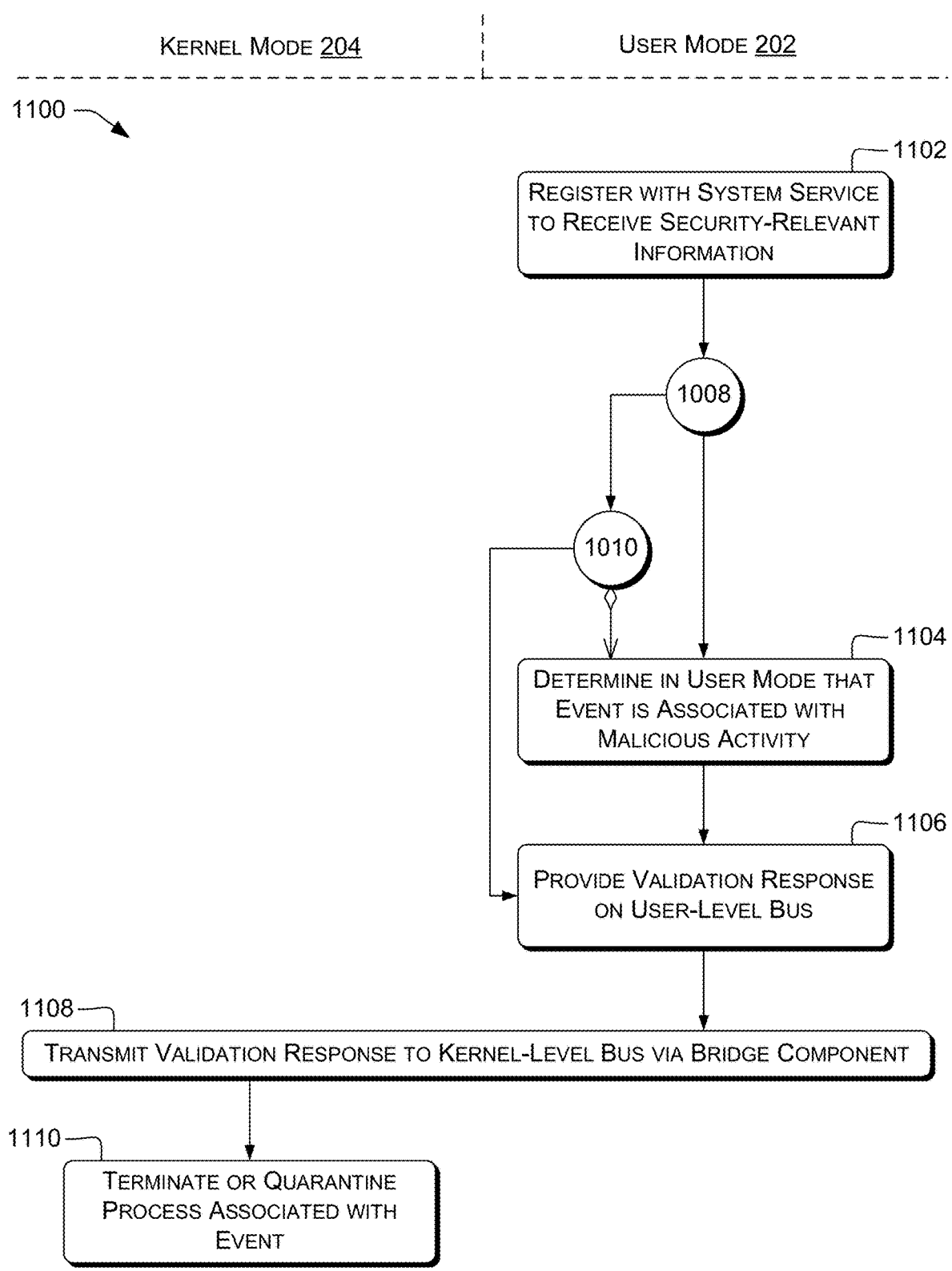
FIG. 11 illustrates example techniques for detecting or responding to malicious activity.
Figure 12:
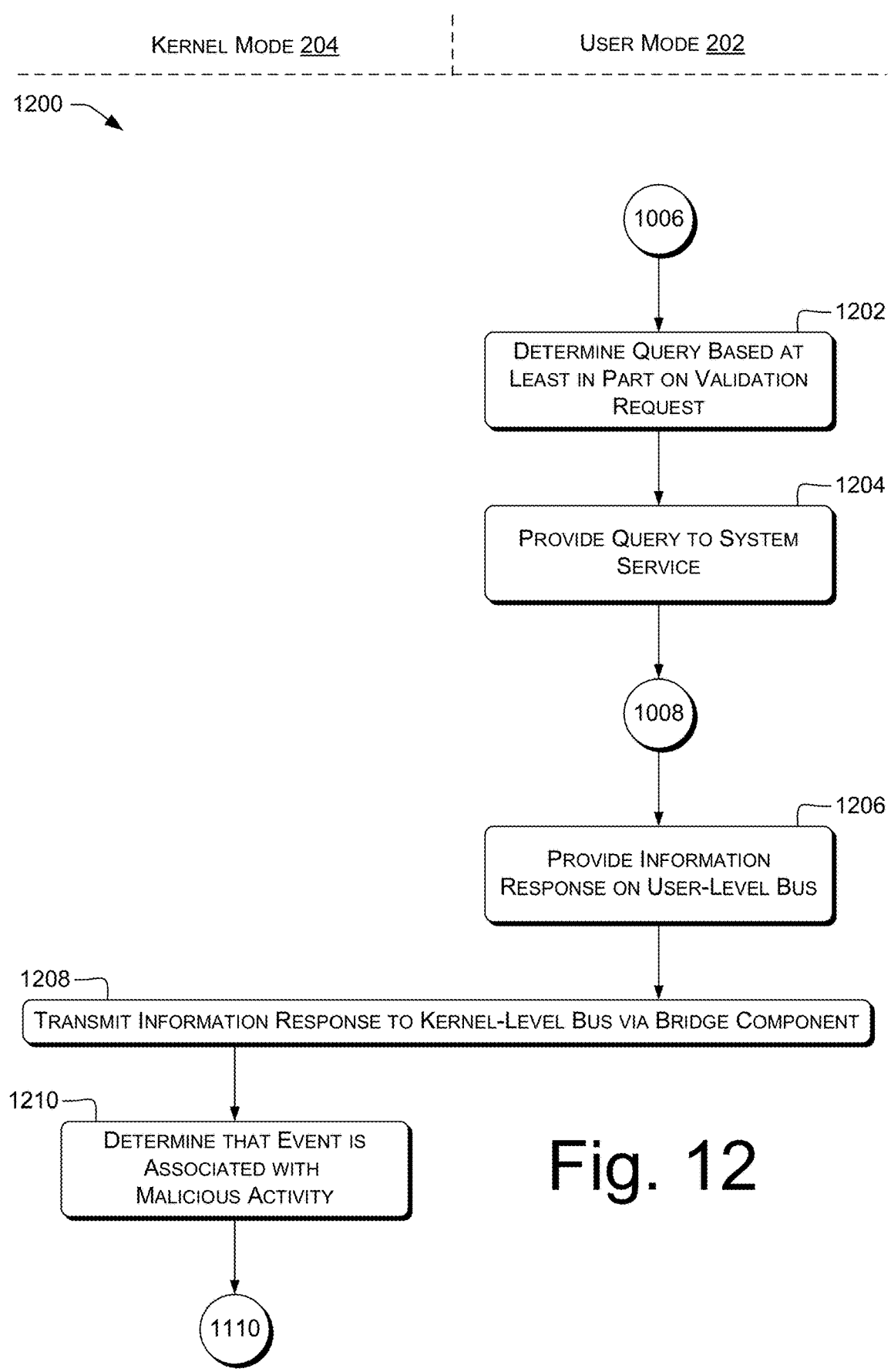
FIG. 12 illustrates example techniques for interacting with a system service and detecting malicious activity.

In some examples, e.g., as discussed herein with reference to FIGS. 10-12, service/hook module 502 can provide data 206 of an event pertaining to application 506 to validator module 902. Validator module 902 can transmit a message associated with the event, via kernel-level bus 126, kernel-level bridge component 130, user-level bridge component 124, and user-level bus 120, to a user-level validation module 904.

User-level validation module 904 can receive security-relevant information from a system service 906, e.g., provided by OS 114, a driver, or another system component accessible through a user-level interface. For example, user-level validation module 904 can query the system service 906 for information, or can receive push notifications (e.g., via registered callbacks) from the system service 906. In some examples, system service 906 runs at, or is accessible via, user mode 202.

User-level validation module 904 can determine, based at least in part on the security-relevant information, whether or not the event is associated with malicious activity. User-level validation module 904 can transmit the determination to service/hook module 502 or validator module 902, e.g., in a message via user-level bus 120, user-level bridge component 124, kernel-level bridge component 130, and kernel-level bus 126. Validator module 902 can communicate with service/hook module 502, in examples in which the message is sent to validator module 902. Service/hook module 502 can then perform mitigation actions such as those described herein. In some examples, e.g., as discussed herein with reference to FIG. 13, user-level validation module 904 can register with system service 906 to respond to security queries. For example, user-level validation module 904 can register as a WINDOWS Antimalware Scan Interface (AMSI) provider. Registration can include, e.g., populating predetermined registry keys (e.g., HKLM\Software\Microsoft\AMSI) or other configuration locations with references to user-level validation module 904. Application 506 can trigger the system service 906, as indicated by the dashed arrow. In some examples of AMSI, the dashed arrow can represent an attempt by application 506 to execute a script. System service 906 can then provide a security query to user-level validation module 904, e.g., an AMSI scan request. User-level validation module 904 can interact with validator module 902 in kernel mode 204 via bridge component 104 to request and receive information about whether a data stream referenced by the security query is associated with malware. User-level validation module 904 can report the results to system service 906. This can permit user-level facilities such as AMSI to benefit from information available in kernel mode 204.

FIG. 10 is a dataflow diagram that illustrates an example technique 1000 for detecting malicious activity on a computing device, and related data items. Operations of technique 1000 can be performed by at least one computing device 102, 110, e.g., using architecture 900. In some examples, one or more non-transitory computer-readable media, e.g., computer-readable memory 112, have thereon computer-executable instructions that, upon execution by one or more processors 106, cause the one or more processors 106 to perform a method of detecting malicious activity on a computing device 102, 110. The method can include operations of technique 1000.

In some examples, technique 1000 can permit using system services that are available, or readily accessible, in user mode 202, but not in kernel mode 204. In some examples, technique 1000 interoperates with a system service, e.g., an OS, hypervisor, or subsystem of either of those, but is separate from the system service. In other examples, technique 1000 is part of a system service, e.g., an OS or subsystem thereof.

In some examples, at block 1002, processor 106 can detect an event associated with a process executing on the computing device 102. Block 1002 can be carried out in a kernel mode 204 of the computing device 102. Examples are discussed herein, e.g., with reference to block 602.

In some examples, at block 1004, processor 106 can provide a validation request associated with the event on a kernel-level bus 126. Examples are discussed herein, e.g., with reference to block 606.

In some examples, at block 1006, processor 106 can transmit, via a bridge component, the validation request to a user-level bus. Examples are discussed herein, e.g., with reference to block 608.

In some examples, at block 1008, processor 106 can receive security-relevant information from a system service of the computing device. Block 1008 can be carried out in user mode 202 of the computing device 102. For example, processor 106 can collect the security-relevant information by making user-level API calls, or by calling back into kernel mode 204 through standard system-call mechanisms that do not require the caller to manage kernel locks or other internal concurrency primitives. In some examples, processor 106 can collect the security-relevant information by activating or calling subsystems that do not exist in kernel mode 204, e.g., the MICROSOFT .NET Framework or a daemon running in user mode 202.

In some examples, at block 1010, processor 106 can determine that the event is associated with malicious activity. Block 1010 can be performed in the user mode 202 (as shown), the kernel mode 204, or partly in each mode 202, 204. Block 1010 can be performed in response to the validation request on the user-level bus 120, in some examples. The determination at block 1010 can be made based at least in part on the security-relevant information. Examples are discussed herein, e.g., with reference to block 610, block 702, and FIG. 8.

In some examples in which block 1010 is performed at least partly in user mode 202, processor 106 can perform communications or computations that would be too time-consuming to maintain system responsiveness if they were performed in the kernel (e.g., taking ≥10 ms). Examples include parsing of large files, and high-data-volume network interactions. This can permit more effectively analyzing events while maintaining system responsiveness. In some examples in which block 1010 is performed at least partly in user mode 202, processor 106 can use code libraries, e.g., third-party libraries, that are not suitable for execution in kernel mode 204. This can permit performing analyses that would not otherwise be feasible to implement.

FIG. 11 is a dataflow diagram that illustrates an example technique 1100 for detecting malicious activity, and related data items. Operations of technique 1100 can be performed by at least one computing device 102, 110, e.g., using architecture 900. In some examples, block 1102 precedes block 1008 or 1010. In some examples, block 1010 includes block 1104 or is followed by block 1106.

In some examples, at block 1102, processor 106 can, in the user mode 202, register with the system service to receive the security-relevant information. Block 1102 can be performed before receiving the security-relevant information at block 1008. For example, processor 106 can register with the system service to receive at least one of: login notifications, or new-session notifications. These notifications may be provided by a process to other registered processes, rather than being provided within the kernel mode 204. Therefore, using block 1102 can permit receiving these notifications. In some examples, security agent 132 can respond to login or new-session notifications by creating user-interface elements accessible to the newly logged-in user, or in the new session. Block 1102 can be followed by blocks 1008 and 1010.

In some examples, at block 1104, processor 106 can determine that the event is associated with malicious activity. Examples are discussed herein, e.g., with reference to block 1010. Block 1104 can specifically be performed in the user mode of the computing device 102.

In some examples, at block 1106, processor 106 can provide a validation response on the user-level bus in response to the determination that the event is associated with malicious activity, e.g., at block 1010 or block 1104. Examples are discussed herein, e.g., with reference to block 612.

In some examples, at block 1108, processor 106 can transmit, via the bridge component, the validation response to the kernel-level bus. Examples are discussed herein, e.g., with reference to block 614.

In some examples, at block 1110, processor 106 can terminate or quarantine a process associated with the event in response to the determination that the event is associated with malicious activity. Block 1110 can be performed in the kernel mode 204. Examples are discussed herein, e.g., with reference to block 706.

FIG. 12 is a dataflow diagram that illustrates an example technique 1200 for detecting malicious activity, and related data items. Operations of technique 1200 can be performed by at least one computing device 102, 110, e.g., using architecture 900. In some examples, block 1006 can be followed by block 1202. In some examples, block 1204 can be followed by block 1108, or block 1108 can be followed by block 1206. In some examples, block 1210 can be followed by block 1110.

In some examples, at block 1202, processor 106 can determine a query based at least in part on the validation request on the user-level bus (from block 1006). Block 1202 can be performed, e.g., in the user mode 202. In some examples of certificate validation, block 1202 can include extracting a digital certificate from the validation request and determining the query comprising the digital certificate. In various examples, block 1202 can include extracting at least part of the validation request, e.g., data 206 associated with the event. The data 206 can include, e.g., information to be checked for authenticity or authorization, or filenames or other identifiers of components of computing device 102 or its stored data to be checked for maliciousness.

In some examples, at block 1204, processor 106 can provide the query to the system service. Block 1204 can include invoking an API, transmitting a request via a network or IPC mechanism, or otherwise accessing the system service. In some examples of certificate validation, block 1204 can include calling verification APIs such as WinVerifyTrust( ) or CertVerifyTimeValidity( ). In some examples, block 1204 can include checking a certificate and its validation chain, and checking whether the root of the validation chain is a trusted root certificate.

In some examples, block 1204 can be followed by block 1008 of receiving the security-relevant information, in response to the query. In some examples of certificate validation, the security-relevant information can indicate whether the digital certificate is valid. The validity of the certificate can be checked, e.g., as a freestanding certificate, or as a member of a certificate chain. In some examples, block 1008 can be followed by block 1206.

In some examples, at block 1206, processor 106 can provide, in the user mode 202, an information response on the user-level bus 120 in response to the validation request. Block 1206 can include determining the information response based at least in part on (e.g., including at least some of) the security-relevant information. Note that block 1008 can include receiving information in addition to the security-relevant information. The information response can indicate, e.g., information other than whether or not the event is associated with malicious activity.

In some examples, at block 1208, processor 106 can transmit, via the bridge component 104, the information response to the kernel-level bus 126. Examples are discussed herein, e.g., with reference to block 614.

In some examples, at block 1210, processor 106 can determine, in the kernel mode 204, that the event is associated with malicious activity. Examples are discussed herein, e.g., with reference to blocks 610 or 1010. The determination at block 1210 can be based at least in part on the security-relevant information in the information response on the kernel-level bus 126. In some examples of certificate validation, block 1210 can include determining that the event is associated with malicious activity if the certificate was not valid, as indicated by the information response. This can permit validating certificates using APIs provided for that purpose, or for other certificate-manipulation purposes (e.g., field extraction), in user mode 202. Using APIs removes the need for user-level security agent 116 or kernel-level security agent 118 to include custom certificate-validation code, which in turn renders the security agents 116, 118 more resistant to attack.

In some examples, block 1210 can be followed by block 1110. In some examples, blocks 1010 and 1210 can be used together or in cooperation to determine, partly in user mode 202 and partly in kernel mode 204, that the event is associated with malicious activity.

Figure 13:
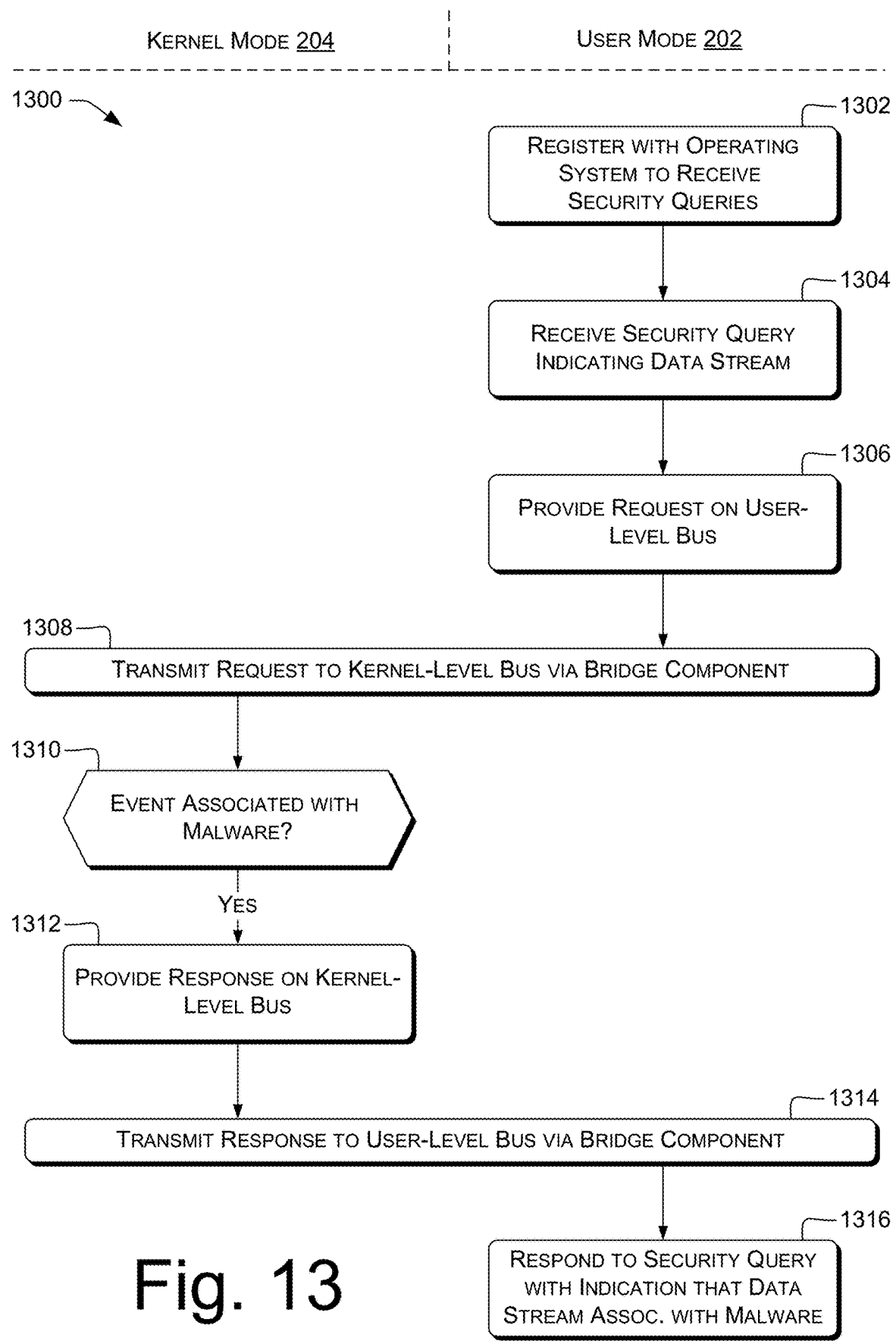
FIG. 13 illustrates an example technique for processing security queries and determining that a data stream is associated with malware.

FIG. 13 is a dataflow diagram that illustrates an example technique 1300 for determining that a data stream is associated with malware, and related data items. Operations of technique 1300 can be performed by at least one computing device 102, 110, e.g., using architecture 900. Operations of technique 1300 can include interacting with an operating system, e.g., to provide a user-level security mechanism with secure access to kernel-level information. Operations of technique 1300 can additionally or alternatively be used for determining that events or system components other than data streams are associated with malware.

In some examples, at block 1302, processor 106 can register, in a user mode 202 of a computing device 102, with an operating system (OS) of the computing device to receive security queries. Examples of registration are discussed herein, e.g., with reference to block 1102. For example, processor 106 can create an object instance implementing an interface defined by the system service. That instance can have a function called by the system service to provide a security query. An example is AMSI. Block 1302 can include registering an IAntimalware or IAntimalwareProvider instance with AMSI.

In some examples of blocks 1102 or 1302, registration with the OS is not available in the kernel mode 204. For example, WINDOWS registration can include running the user-mode program regsvr32. Performing blocks 1102 or 1302 in the user mode 202 permits registering, which would not otherwise be possible in some examples.

In some examples, at block 1304, processor 106 can, subsequent to block 1302, receive a security query indicating a data stream. In some examples, the data stream comprises a script, e.g., in the POWERSHELL, VBSCRIPT, or JAVASCRIPT languages, or another language, that is ready for execution. Scripts can be ready for execution, e.g., when they are in a form acceptable to a core parser as input; after deobfuscation (e.g., base64, uudecode, or rot13), decryption, or decompression; compiled into bytecode or machine code; or otherwise in a form acceptable as input to a software module or OS routine that will unconditionally execute the script.

In some examples, at block 1306, in response to the security query, processor 106 can provide a request on a user-level bus, the request indicating the data stream. Examples are discussed herein, e.g., with reference to blocks 1106 or 1206. Block 1306 can include blocking the security query for a response, or responding to the security query with an indication that the query will be answered asynchronously.

In some examples, at block 1308, processor 106 can transmit, via a bridge component 104, the request to a kernel-level bus 126. Examples are discussed herein, e.g., with reference to block 614.

In some examples, at block 1310, processor 106 can determine, in a kernel mode 204 of the computing device 102, in response to the request on the kernel-level bus 126, that the data stream is associated with malware. Examples are discussed herein, e.g., with reference to FIG. 1 or blocks 610, 1010, 1104, or 1210.

In some examples, at least one of block 1306 or block 1310 can include determining, by the processor 106, a summary representation of the data stream. For example, processor 106 can determine a hash of the contents of the data stream, or of at least a portion thereof. Block 1310, in some of these examples, can include determining, by the processor 106, in the kernel mode 204, that the summary representation is associated with malware. For example, processor 106 can query a database (e.g., a local database, or a remote database operated, e.g., by a security service provider) or catalog with the summary representation as the key to retrieve a value indicating whether the data stream is associated with malware. Examples are discussed herein, e.g., with reference to block 806.

In some examples, at block 1312, processor 106 can provide a response on the kernel-level bus in response to the determination that the data stream is associated with malware. Examples are discussed herein, e.g., with reference to FIG. 3 or block 612.

In some examples, at block 1314, processor 106 can transmit, via the bridge component 104, the response to the user-level bus 120. Examples are discussed herein, e.g., with reference to block 608.

In some examples, at block 1316, processor 106 can, in response to the response on the user-level bus 120, in the user mode 202, respond to the security query with an indication that the data stream is associated with malware. The response can unblock the query, or can be provided to a callback or event-handler as an asynchronous response.

Example Clauses

Various examples include one or more of, including any combination of any number of, the following example features. Throughout these clauses, parenthetical remarks are for example and explanation, and are not limiting.

A: A method of detecting malicious activity on a computing device, the method comprising: detecting, in a kernel mode of the computing device, an event associated with a process executing on the computing device; determining, in the kernel mode, that validation of the event is required; in response, providing a validation request on a kernel-level bus; transmitting, via a bridge component, the validation request to a user-level bus; determining, in a user mode of the computing device, in response to the validation request on the user-level bus, that the event is associated with malicious activity; providing a validation response on the user-level bus in response to the determination that the event is associated with malicious activity; and transmitting, via the bridge component, the validation response to the kernel-level bus.

B: The method according to paragraph A, the operation of determining that the event is associated with malicious activity comprising processing, in the user mode, at least some data associated with the event in a restricted-privilege execution environment.

C: The method according to paragraph A or B, further comprising, in the kernel mode, terminating or quarantining the process in response to the validation response on the kernel-level bus.

D: The method according to paragraph C, wherein: the event is associated with a request for service; and the method further comprises, in the kernel mode, permitting the request to succeed before receiving the validation response on the kernel-level bus.

E: The method according to any of paragraphs A-D, wherein: the event is associated with a request for service; and the method further comprises, in the kernel mode: blocking the request to await validation; and causing the request to fail in response to the validation response on the kernel-level bus.

F: The method according to any of paragraphs A-E, wherein: the event is associated with a request to create a second process; and the method further comprises, in the kernel mode: permitting the request to succeed before receiving the validation response on the kernel-level bus; and terminating or quarantining the second process in response to the validation response on the kernel-level bus.

G: The method according to any of paragraphs A-F, further comprising: providing, in the kernel mode, the validation request identifying a file to which access is requested; determining, in the user mode, that the file is associated with malicious activity; and in response, determining that the event is associated with malicious activity.

H: The method according to paragraph G, further comprising at least: determining that the file corresponds with a catalog of malicious files; or applying at least some data of the file to a machine-learning model and receiving from the machine-learning model an indication that the at least some data is associated with malicious activity (in various non-limiting examples, only the catalog can be used, or only the machine-learning model, or both).

I: One or more non-transitory computer-readable media having thereon computer-executable instructions that, upon execution by one or more processors, cause the one or more processors to perform a method of detecting malicious activity on a computing device, the method comprising: detecting, in a kernel mode of the computing device, an event associated with a process executing on the computing device; providing a validation request associated with the event on a kernel-level bus; transmitting, via a bridge component, the validation request to a user-level bus; receiving security-relevant information, from a system service of the computing device in a user level of the computing device; and determining that the event is associated with malicious activity: in response to the validation request on the user-level bus; and based at least in part on the security-relevant information.

J: The one or more non-transitory computer-readable media according to paragraph I, the method further comprising: determining, in the user mode of the computing device, that the event is associated with malicious activity; providing a validation response on the user-level bus in response to the determination that the event is associated with malicious activity; and transmitting, via the bridge component, the validation response to the kernel-level bus.

K: The one or more non-transitory computer-readable media according to paragraph I or J, the method further comprising: providing, in the user mode, an information response on the user-level bus in response to the validation request, the information response determined based at least in part on the security-relevant information; transmitting, via the bridge component, the information response to the kernel-level bus; and determining that the event is associated with malicious activity: in the kernel mode; and based at least in part on the security-relevant information in the information response on the kernel-level bus.

L: The one or more non-transitory computer-readable media according to any of paragraphs I-K, the method further comprising, in the kernel mode, terminating or quarantining the process in response to the determination that the event is associated with malicious activity.

M: The one or more non-transitory computer-readable media according to any of paragraphs I-L, the method further comprising, in the user mode: determining a query based at least in part on the validation request on the user-level bus; providing the query to the system service; and receiving the security-relevant information in response to the query.

N: The one or more non-transitory computer-readable media according to paragraph M, the method further comprising, in the user mode: extracting a digital certificate from the validation request; determining the query comprising the digital certificate; and receiving the security-relevant information indicating whether the digital certificate is valid.

O: The one or more non-transitory computer-readable media according to any of paragraphs I-N, the method further comprising, in the user mode, before receiving the security-relevant information, registering with the system service to receive the security-relevant information.

P: The one or more non-transitory computer-readable media according to paragraph O, the method further comprising, in the user mode, registering with the system service to receive at least login notifications or new-session notifications.

Q: A method comprising: registering, in a user mode of a computing device, with an operating system (OS) of the computing device to receive security queries; subsequently, receiving a security query indicating a data stream; in response, providing a request on a user-level bus, the request indicating the data stream; transmitting, via a bridge component, the request to a kernel-level bus; determining, in a kernel mode of the computing device, in response to the request on the kernel-level bus, that the data stream is associated with malware; providing a response on the kernel-level bus in response to the determination that the data stream is associated with malware; transmitting, via the bridge component, the response to the user-level bus; and in response to the response on the user-level bus, at the user level, responding to the security query with an indication that the data stream is associated with malware.

R: The method according to paragraph Q, wherein the data stream comprises a script that is ready for execution.

S: The method according to paragraph Q or R, further comprising: determining a summary representation of the data stream; and determining, in the kernel mode, that the summary representation is associated with malware.

T: The method according to any of paragraphs Q-S, further comprising registering with the WINDOWS Antimalware Scan Interface (AMSI) to receive the security queries.

U: A system comprising: at least one processor; memory storing computer-executable instructions that, when executed by the at least one processor, cause the system to: open a communications port for sending data originating from a first endpoint component to a second endpoint component, wherein: the first endpoint component is executable in at least one of: (i) a kernel mode of the system, or (ii) a user mode of the system, and the second endpoint component is executable in the other of the kernel mode or the user mode; set the communications port to a connected state to create an opened and connected communications port; send a message containing the data via the opened and connected communications port; and receive the data at the second endpoint component.

V: The system of paragraph U, wherein: the computer-executable instructions cause the system to open the communications port by causing a first bridge component to activate a function to initialize the communications port in the kernel mode; and the computer-executable instructions cause the system to set the communications port to the connected state in response to a second bridge component activating the function in the user mode.

W: The system of paragraph V, wherein the communications port is set to a waiting state in response to activation of the function by the first bridge component and until the second bridge component activates the function.

X: The system of any of paragraphs U-W, wherein: the computer-executable instructions cause the system to open the communications port by causing a first bridge component to activate a function to initialize the communications port in the user mode; and the computer-executable instructions cause the system to set the communications port to the connected state in response to a second bridge component activating the function in the kernel mode.

Y: The system of any of paragraphs U-X, wherein: opening the communications port further comprises returning a port handle for the communications port; and sending the message is based at least in part on the port handle.

Z: The system of any of paragraphs U-Y, wherein opening the communications port further comprises assigning a port identifier to the communications port that uniquely identifies the communications port by differentiating the communications port from other communications ports that have been opened on the computing device.

AA: A method comprising: opening a communications port for sending data originating from a first endpoint component to a second endpoint component, wherein: the first endpoint component is executable in at least one of: (i) a kernel mode of a computing device, or (ii) a user mode of the computing device, and the second endpoint component is executable in the other of the kernel mode or the user mode; setting the communications port to a connected state; in response to opening the communications port and setting the communications port to the connected state, sending a message containing the data via the communications port; and receiving the data at the second endpoint component.

AB: The method of paragraph AA, further comprising, prior to sending the message via the communications port: serializing the data as serialized data; and creating the message based at least in part on the serialized data.

AC: The method of paragraph AB, wherein: the serialized data comprises a message buffer having a starting address and a length; and sending the message comprises activating a function that specifies the starting address and the length of the message buffer.

AD: The method of paragraph AC, wherein: the function comprises a synchronous function; and the message buffer remains valid and unchanged at least until a call to the synchronous function is returned with at least one of an indication that the message was successfully sent, an indication that a timeout occurred, or an indication that the message failed to send.

AE: The method of paragraph AC or AD, wherein: the function comprises an asynchronous function; and the message buffer remains valid and unchanged at least until a callback function is activated in response to at least one of the message being successfully sent, a timeout occurring, or the message failing to send.

AF: The method of paragraph AE, wherein sending the message comprises: queuing the message; and sending the message in a different thread context than a thread context in which the message was queued.

AG: The method of any of paragraphs AB-AF, further comprising, prior to receiving the data at the second endpoint component: deserializing the serialized data to obtain the data; and providing the data to at least one of: (i) a kernel-level component instantiated in the kernel mode, or (ii) a user-level component instantiated in the user mode.

AH: The method of any of paragraphs AA-AG, wherein: opening the communications port comprises activating a function to initialize the communications port in the kernel mode; and setting the communications port to the connected state occurs in response to activating the function in the user mode.

AI: The method of any of paragraphs AA-AH, wherein: opening the communications port comprises activating a function to initialize the communications port in the user mode; and setting the communications port to the connected state occurs in response to activating the function in the kernel mode.

AJ: The method of any of paragraphs AA-AI, wherein: the first endpoint component is attached to at least one of: (i) a kernel-level bus of a kernel-level security agent executing in the kernel mode, or (ii) a user-level bus of a user-level security agent executing in the user mode; and the second endpoint component is attached to the other of the kernel-level bus or the user-level bus.

AK: One or more non-transitory computer-readable media storing computer-executable instructions configured to implement a symmetric bridge component for sending data between a kernel mode of a computing device and a user mode of the computing device, the symmetric bridge component performing operations comprising: opening a communications port for sending the data originating from a first endpoint component to a second endpoint component, wherein: the first endpoint component is executable in at least one of: (i) the kernel mode, or (ii) the user mode, and the second endpoint component is executable in the other of the kernel mode or the user mode; setting the communications port to a connected state; and in response to opening the communications port and setting the communications port to the connected state, sending a message containing the data via the communications port.

AL: The one or more non-transitory computer-readable media of paragraph AK, wherein: opening the communications port comprises activating a function to initialize the communications port in the kernel mode; and setting the communications port to the connected state occurs in response to activating the function in the user mode.

AM: The one or more non-transitory computer-readable media of paragraph AK or AL, wherein: opening the communications port comprises activating a function to initialize the communications port in the user mode; and setting the communications port to the connected state occurs in response to activating the function in the kernel mode.

AN: The one or more non-transitory computer-readable media of any of paragraphs AK-AM, wherein: opening the communications port further comprises returning a port handle for the communications port; and sending the message is based at least in part on the port handle.

AO: The one or more non-transitory computer-readable media of any of paragraphs AK-AN, wherein opening the communications port further comprises assigning a port identifier to the communications port that uniquely identifies the communications port by differentiating the communications port from other communications ports that have been opened on the computing device.

AP: A computer-readable medium, e.g., a computer storage medium, having thereon computer-executable instructions, the computer-executable instructions upon execution configuring a computer to perform operations as any of paragraphs A-H, I-P, Q-T, U-Z, AA-AJ, or AK-AO recites.

AQ: A device comprising: a processor; and a computer-readable medium, e.g., a computer storage medium, having thereon computer-executable instructions, the computer-executable instructions upon execution by the processor configuring the device to perform operations as any of paragraphs A-H, I-P, Q-T, U-Z, AA-AJ, or AK-AO recites.

AR: A system comprising: means for processing; and means for storing having thereon computer-executable instructions, the computer-executable instructions including means to configure the system to carry out a method as any of paragraphs A-H, I-P, Q-T, U-Z, AA-AJ, or AK-AO recites.

AS: A system, device, method, or computer-readable medium storing instructions, to perform operations as any of paragraphs A-H, I-P, or Q-T recites, wherein communication via the bridge component is carried out as any of paragraphs U-Z, AA-AJ, or AK-AO recites.

AT: A system, device, method, or computer-readable medium storing instructions, as recited in any of paragraphs A-AS, wherein each referenced process is selected from the group consisting of the following items, or from a group consisting of a proper subset of the following items: an operating-system process, a thread, a lightweight process, a process group, a thread that is available to execute but whose parent process has been removed or is inaccessible, and a specific software module or group of modules running in the context of any of the preceding items.

CONCLUSION

Various examples permit kernel-level malware detection to make use of user-level services (e.g., FIG. 6), or permit user-level malware detection to make use of kernel-level services (e.g., FIG. 13). Various examples provide increased flexibility in determining whether to implement particular tests for malware in user mode 202 or kernel mode 204. Various examples of security agents 132 move operations into user mode 202 to reduce the probability that an exploit of the security agent 132 itself will compromise the computing device 102. Various examples of security agents 132 are used in implementing real-time or other anti-virus programs. Various examples permit developing user-level components 122 separately from kernel-level components 128, which can reduce the complexity of components 122, 128. Various examples offload long-running analysis tasks to user mode 202, and thereby permit handling hundreds of thousands of kernel-level events per second without degrading system responsiveness.

The word "or" and the phrase "and/or" are used herein in an inclusive sense unless specifically stated otherwise. Accordingly, conjunctive language such as, but not limited to, at least one of the phrases "X, Y, or Z," "at least X, Y, or Z," "at least one of X, Y or Z," "one or more of X, Y, or Z," and/or any of those phrases with "and/or" substituted for "or," unless specifically stated otherwise, is to be understood as signifying that an item, term, etc. can be either X, or Y, or Z, or a combination of any elements thereof (e.g., a combination of XY, XZ, YZ, and/or XYZ). Any use herein of phrases such as "X, or Y, or both" or "X, or Y, or combinations thereof" is for clarity of explanation and does not imply that language such as "X or Y" excludes the possibility of both X and Y, unless such exclusion is expressly stated.

As used herein, language such as "one or more Xs" shall be considered synonymous with "at least one X" unless otherwise expressly specified. Any recitation of "one or more Xs" signifies that the described steps, operations, structures, or other features may, e.g., include, or be performed with respect to, exactly one X, or a plurality of Xs, in various examples, and that the described subject matter operates regardless of the number of Xs present, as long as that number is greater than or equal to one.

Conditional language such as, among others, "can," "could," "might" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Although some features and examples herein have been described in language specific to structural features and/or methodological steps, it is to be understood that the appended claims are not necessarily limited to the specific features or steps described herein. Rather, the specific features and steps are disclosed as preferred forms of implementing the claimed invention. For example, computing device 102, processor 106, and other structures described herein for which multiple types of implementing devices or structures are listed can include any of the listed types, and/or multiples and/or combinations thereof.

Moreover, this disclosure is inclusive of combinations of the aspects described herein. References to "a particular aspect" (or "embodiment" or "version") and the like refer to features that are present in at least one aspect of the invention. Separate references to "an aspect" (or "embodiment") or "particular aspects" or the like do not necessarily refer to the same aspect or aspects; however, such aspects are not mutually exclusive, unless so indicated or as are readily apparent to one of skill in the art. The use of singular or plural in referring to "method" or "methods" and the like is not limiting.

It should be emphasized that many variations and modifications can be made to the above-described examples, the elements of which are to be understood as being among other acceptable examples. All such modifications and variations are intended to be included herein within the scope of this disclosure and protected by the following claims. Moreover, in the claims, any reference to a group of items provided by a preceding claim clause is a reference to at least some of the items in the group of items, unless specifically stated otherwise. This document expressly envisions alternatives with respect to each and every one of the following claims individually, in any of which claims any such reference refers to each and every one of the items in the corresponding group of items. Furthermore, in the claims, unless otherwise explicitly specified, an operation described as being "based on" a recited item can be performed based on only that item, or based at least in part on that item. This document expressly envisions alternatives with respect to each and every one of the following claims individually, in any of which claims any "based on" language refers to the recited item(s), and no other(s). Additionally, in any claim using the "comprising" transitional phrase, a recitation of a specific number of components (e.g., "two Xs") is not limited to embodiments including exactly that number of those components, unless expressly specified (e.g., "exactly two Xs"). However, such a claim does describe both embodiments that include exactly the specified number of those components and embodiments that include at least the specified number of those components.

Some operations of example techniques or devices herein are illustrated in individual blocks and logical flows thereof, and are summarized with reference to those blocks. The order in which the operations are described is not intended to be construed as a limitation unless otherwise indicated. Any number of the described operations can be executed in any order, combined in any order, subdivided into multiple sub-operations, or executed in parallel to implement the described techniques. For example, in alternative implementations included within the scope of the examples described herein, elements or functions can be deleted, or executed out of order from that shown or discussed, including substantially synchronously or in reverse order.

Each illustrated block can represent one or more operations that can be implemented in hardware, software, or a combination thereof. In the context of software, the operations described herein represent computer-executable instructions stored on at least one computer-readable medium (e.g., computer storage medium) that, when executed by one or more processors, cause or enable the one or more processors to perform the recited operations. Generally, computer-executable instructions include routines, programs, objects, modules, code segments, components, data structures, and the like that perform particular functions or implement particular abstract data types.

Accordingly, the methods, techniques, or operations described above can be embodied in, and fully automated via, software code modules executed by one or more computers or processors. As used herein, the term "module" is intended to represent example divisions of the described operations (e.g., implemented in software or hardware) for purposes of discussion, and is not intended to represent any type of requirement or required method, manner or organization. Therefore, while various "modules" are discussed herein, their functionality and/or similar functionality can be arranged differently (e.g., combined into a smaller number of modules, broken into a larger number of modules, etc.). In some instances, the functionality and/or modules discussed herein may be implemented as part of a computer operating system (OS). In other instances, the functionality and/or modules may be implemented as part of a device driver, firmware, application, or other software subsystem.

Example computer-implemented operations described herein can additionally or alternatively be embodied in specialized computer hardware. For example, various aspects herein may take the form of an entirely hardware aspect, an entirely software aspect (including firmware, resident software, micro-code, etc.), or an aspect combining software and hardware aspects. These aspects can all generally be referred to herein as a "service," "circuit," "circuitry," "module," or "system." The described techniques can be performed by resources associated with one or more computing devices 102, such as one or more internal or external CPUs or GPUs, or one or more pieces of hardware logic such as FPGAs, DSPs, or other types of accelerators.

What is claimed is:

1. A method of detecting malicious activity on a computing device, the method comprising:
   detecting, in a kernel mode of the computing device, an event associated with a process executing on the computing device;
   determining, in the kernel mode, that validation of the event is required;
   in response, providing a validation request on a kernel-level bus;
   transmitting, via a bridge component, the validation request to a user-level bus;
   receiving security-relevant information from a system service of the computing device in a user mode of the computing device;
   providing, in the user mode, an information response on the user-level bus, the information response determined based at least in part on the security-relevant information; and
   transmitting, via the bridge component, the information response to the kernel-level bus; and
   determining that the event is associated with malicious activity:
   in the kernel mode; and
   based at least in part on the security-relevant information in the information response on the kernel-level bus.

2. The method according to claim 1, the operation of determining that the event is associated with malicious activity comprising:
   applying at least some data associated with the event to a machine-learning model; and
   receiving from the machine-learning model an indication that the at least some data is associated with malicious activity.

3. The method according to claim 1, further comprising, in the kernel mode, terminating or quarantining the process in response to determining that the event is associated with malicious activity.

4. The method according to claim 3, wherein:
the event is associated with a request for service; and
the method further comprises, in the kernel mode, permitting the request to succeed before receiving the information response on the kernel-level bus.

5. The method according to claim 1, wherein:
the event is associated with a request for service; and
the method further comprises, in the kernel mode:
blocking the request to await validation; and
causing the request to fail in response to determining that the event is associated with malicious activity.

6. The method according to claim 1, wherein:
the event is associated with a request to create a second process; and
the method further comprises, in the kernel mode:
permitting the request to succeed before receiving the information response on the kernel-level bus; and
terminating or quarantining the second process in response to determining that the event is associated with malicious activity.

7. The method according to claim 1, further comprising:
providing, in the kernel mode, the validation request identifying a file to which access is requested;
determining that the file is associated with malicious activity; and
in response, determining that the event is associated with malicious activity.

8. The method according to claim 7, further comprising at least one of:
determining that the file corresponds with a catalog of malicious files; or
applying at least some data of the file to a machine-learning model and receiving from the machine-learning model an indication that the at least some data is associated with malicious activity.

9. One or more non-transitory computer-readable media having thereon computer-executable instructions that, upon execution by one or more processors, cause the one or more processors to perform a method of detecting malicious activity on a computing device, the method comprising:
detecting, in a kernel mode of the computing device, an event associated with a process executing on the computing device;
providing a validation request associated with the event on a kernel-level bus;
transmitting, via a bridge component, the validation request to a user-level bus;
receiving security-relevant information from a system service of the computing device in a user mode of the computing device;
providing, in the user mode, an information response on the user-level bus, the information response determined based at least in part on the security-relevant information;
transmitting, via the bridge component, the information response to the kernel-level bus; and
determining that the event is associated with malicious activity:
in the kernel mode; and
based at least in part on the security-relevant information in the information response on the kernel-level bus.

10. The one or more non-transitory computer-readable media according to claim 9, the method further comprising, in the kernel mode, terminating or quarantining the process in response to the determination that the event is associated with malicious activity.

11. The one or more non-transitory computer-readable media according to claim 9, the method further comprising, in the user mode:
determining a query based at least in part on the validation request on the user-level bus;
providing the query to the system service; and
receiving the security-relevant information in response to the query.

12. The one or more non-transitory computer-readable media according to claim 11, the method further comprising, in the user mode:
extracting a digital certificate from the validation request;
determining the query comprising the digital certificate; and
receiving the security-relevant information indicating whether the digital certificate is valid.

13. The one or more non-transitory computer-readable media according to claim 9, the method further comprising, in the user mode, before receiving the security-relevant information, registering with the system service to receive the security-relevant information.

14. The one or more non-transitory computer-readable media according to claim 13, the method further comprising, in the user mode, registering with the system service to receive at least login notifications or new-session notifications.

15. A method comprising:
registering, in a user mode of a computing device, with an operating system (OS) of the computing device to receive security queries;
subsequently, receiving a security query indicating a data stream;
in response, providing a request on a user-level bus, the request indicating the data stream;
transmitting, via a bridge component, the request to a kernel-level bus;
determining, in a kernel mode of the computing device, in response to the request on the kernel-level bus, that the data stream is associated with malware;
providing a response on the kernel-level bus in response to the determination that the data stream is associated with malware;
transmitting, via the bridge component, the response to the user-level bus; and
in response to the response on the user-level bus, in the user mode, responding to the security query with an indication that the data stream is associated with malware.

16. The method according to claim 15, wherein the data stream comprises a script that is ready for execution.

17. The method according to claim 15, further comprising:
determining a summary representation of the data stream; and
determining, in the kernel mode, that the summary representation is associated with malware.

18. The method according to claim 15, further comprising registering with the WINDOWS Antimalware Scan Interface (AMSI) to receive the security queries.

19. The method according to claim 1, further comprising, in the user mode, before receiving the security-relevant information, registering with the system service to receive the security-relevant information.

20. The one or more non-transitory computer-readable media according to claim 9, wherein transmitting, via the bridge component, the validation request to the user-level bus comprises:
- opening a communications port to create an opened but disconnected communications port in response to activating a function in the kernel mode;
- setting the opened but disconnected communications port to a connected state to create an opened and connected communications port in response to activating the function in the user mode; and
- transmitting the validation request via the opened and connected communications port from a first endpoint component executable in the kernel mode to a second endpoint component executable in the user mode.

* * * * *